(12) United States Patent  
Park et al.

(10) Patent No.: US 11,606,778 B2  
(45) Date of Patent: Mar. 14, 2023

(54) METHOD AND APPARATUS FOR TRANSMISSION AND RECEPTION OF BROADCAST INFORMATION IN WIRELESS COMMUNICATION SYSTEM

(71) Applicant: Samsung Electronics Co., Ltd., Gyeonggi-do (KR)

(72) Inventors: Sungjin Park, Gyeonggi-do (KR); Hyunseok Ryu, Gyeonggi-do (KR); Jinkyu Kang, Gyeonggi-do (KR); Jonghyun Bang, Gyeonggi-do (KR); Cheolkyu Shin, Gyeonggi-do (KR); Jeongho Yeo, Gyeonggi-do (KR); Jinyoung Oh, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/171,616

(22) Filed: Feb. 9, 2021

(65) Prior Publication Data

US 2021/0250910 A1  Aug. 12, 2021

(30) Foreign Application Priority Data

Feb. 11, 2020 (KR) .................. 10-2020-0016591  
Mar. 2, 2020 (KR) .................. 10-2020-0026195  
May 14, 2020 (KR) .................. 10-2020-0057710

(51) Int. Cl.
*H04W 56/00* (2009.01)
*H04W 72/02* (2009.01)
(Continued)

(52) U.S. Cl.
CPC ....... *H04W 72/02* (2013.01); *H04L 27/26025* (2021.01); *H04W 56/001* (2013.01); *H04W 72/0446* (2013.01); *H04W 72/30* (2023.01)

(58) Field of Classification Search
CPC ............ H04W 72/02; H04W 56/001; H04W 72/005; H04W 72/0446; H04L 27/26025
(Continued)

(56) References Cited

U.S. PATENT DOCUMENTS

| 2020/0037306 A1 | 1/2020 | Seo |
| 2020/0045697 A1 | 2/2020 | Choi et al. |
| 2021/0099988 A1* | 4/2021 | Wu ............... H04L 5/0091 |
| 2022/0046632 A1* | 2/2022 | Zhao ............ H04L 27/26025 |

FOREIGN PATENT DOCUMENTS

WO  WO 2021/098305  5/2021

OTHER PUBLICATIONS

Huawei, HiSilicon, "Sidelink Synchronization Mechanisms for NR V2X", R1-1911885, 3GPP TSG RAN WG1 Meeting #99, Nov. 18-22, 2019, 24 pages.

(Continued)

*Primary Examiner* — Sai Ming Chan  
(74) *Attorney, Agent, or Firm* — The Farrell Law Firm, P.C.

(57) ABSTRACT

Disclosed is a method performed by a first terminal in a wireless communication system, including transmitting, to a second terminal on a physical sidelink broadcast channel (PSBCH), slot format information for a sidelink communication, the slot format information including first information on a number of patterns, second information on a period of pattern, and third information on a number of uplink slots of pattern, and performing, with the second terminal, the sidelink communication in at least one sidelink resource identified based on the first information, the second information, and the third information, wherein, when the first information indicates the number of patterns as 1, the second information indicates the period of pattern for a pattern, and the third information indicates the number of uplink slots for the pattern, and when the first information indicates the (Continued)

number of patterns as 2, the second information indicates the period of pattern for a first pattern and a second pattern, and the third information indicates the number of uplink slots for the first pattern and the second pattern.

20 Claims, 24 Drawing Sheets

(51) Int. Cl.
    *H04L 27/26*     (2006.01)
    *H04W 72/30*     (2023.01)
    *H04W 72/0446*     (2023.01)

(58) Field of Classification Search
    USPC .......................................................... 370/329
    See application file for complete search history.

(56) References Cited

OTHER PUBLICATIONS

LG Electronics, "Discussion on NR Sidelink Synchronization Mechanism", R1-1912590, 3GPP TSG RAN WG1 #99 Meeting, Nov. 18-22, 2019, 9 pages.
Catt, "Sidelink Synchronization Mechanism in NR V2X", R1-1912156, 3GPP TSG RAN WG1 Meeting #99, Nov. 18-22, 2019, 15 pages.
Vivo, "Sidelink Synchronization Mechanism", R1-1912024, 3GPP TSG RAN WG1 Meeting #99, Nov. 18-22, 2019, 19 pages.
International Search Report dated May 13, 2021 issued in counterpart application No. PCT/KR2021/001457, 3 pages.
European Search Report dated Jan. 3, 2023 issued in counterpart application No. 21754316.4-1215, 9 pages.

\* cited by examiner

In - coverage Scenario

Partial coverage Scenario

Out - of - coverage Scenario

Groupcast V2X Communication

FIG. 7A
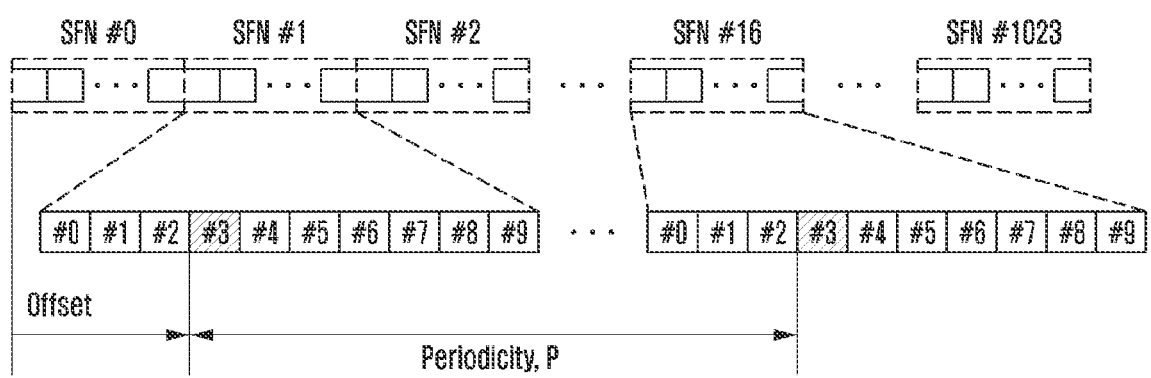
 : The slot where S - SSB is transmitted

FIG. 10

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | U | U | D | D | D | D | F | U | U |
| 50 | D | D | D | F | F | U | U | D | D | D | F | F | U | U |
| 51 | D | D | F | F | F | U | U | D | D | F | F | F | U | U |
| 52 | D | F | F | F | F | U | U | D | F | F | F | F | U | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56~254 | Reserved | | | | | | | | | | | | | |
| 255 | UE determines the slot format for the slot based on TDD-UL-DL-ConfigurationCommon, or TDD-UL-DL-ConfigDedicated and, if any, on detected DCI formats | | | | | | | | | | | | | |

METHOD AND APPARATUS FOR TRANSMISSION AND RECEPTION OF BROADCAST INFORMATION IN WIRELESS COMMUNICATION SYSTEM

CROSS-REFERENCE TO RELATED APPLICATION(S)

This application is based on and claims priority under 35 U.S.C. § 119 to Korean Patent Application Nos. 10-2020-0016591, 10-2020-0026195, and 10-2020-0057710, filed on Feb. 11, 2020, Mar. 2, 2020, and May 14, 2020, respectively, in the Korean Intellectual Property Office, the disclosures of which are incorporated herein by reference in their entireties.

BACKGROUND

1. Field

The disclosure relates generally to a method for transmitting and receiving broadcast information in a wireless communication system, and more particularly, to a method and apparatus for transmitting and receiving a configuration of broadcast information in a sidelink communication system.

2. Description of Related Art

To meet the demand for wireless data traffic having increased since deployment of 4th Generation (4G) communication systems, efforts have been made to develop an improved 5th Generation (5G) or pre-5G communication system, also referred to as a beyond 4G network or a post long term evolution (LTE) system. The 5G communication system established by the 3rd Generation Partnership Project (3GPP) is referred to as a new radio (NR) system.

The 5G communication system is considered to be implemented in higher frequency millimeter wave (mmWave) bands, e.g., 60 gigahertz (GHz) bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, large scale antenna techniques have been discussed and adopted in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), and reception-end interference cancellation. In the 5G system, hybrid frequency shift keying (FSK), quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet is now evolving to the Internet of things (IoT) where distributed entities, such as things, exchange and process information without human intervention. The Internet of everything (IoE), which is a combination of the IoT technology and the big data processing technology through connection with a cloud server, has also emerged. As technology elements, such as "sensing technology", "wired/wireless communication and network infrastructure", "service interface technology", and "security technology" have been demanded for IoT implementation, a sensor network, a machine-to-machine (M2M) communication, and machine type communication (MTC) have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Thus, various attempts have been made to apply 5G communication systems to IoT networks. For example, technologies such as a sensor network, MTC, and M2M communication may be implemented by beamforming, MIMO, and array antennas. Application of a cloud radio access network (RAN) as the above-described big data processing technology may also be considered as an example of convergence between the 5G technology and the IoT technology.

With the development of mobile communication systems, a large variety of services can now be provided. However, the prior art is lacking with respect to efficiency of a process of configuring, transmitting, and receiving sidelink broadcast information in a sidelink communication system.

Accordingly, a method for more efficiently providing such services is required.

SUMMARY

The disclosure is provided to address at least the above-mentioned problems and/or disadvantages and to provide at least the advantages described below.

Accordingly, an aspect of the disclosure is to provide a method for configuring broadcast information in a sidelink communication system and to a method and apparatus for transmitting and receiving the broadcast information.

Another aspect of the disclosure is to provide a more efficient process of configuring, transmitting, and receiving sidelink broadcast information in a sidelink communication system.

In accordance with an aspect of the disclosure, a method performed by a first terminal includes transmitting, to a second terminal on a physical sidelink broadcast channel, slot format information for a sidelink communication, the slot format information including first information on a number of patterns, second information on a period of pattern, and third information on a number of uplink slots of pattern, and performing, with the second terminal, the sidelink communication in at least one sidelink resource identified based on the first information, the second information, and the third information, wherein, in case that the first information indicates the number of the patterns as 1, the second information indicates the period of pattern for a pattern, and the third information indicates the number of uplink slots for the pattern, and wherein, in case that the first information indicates the number of patterns as 2, the second information indicates the period for a first pattern and a second pattern, and the third information indicates the number of uplink slots for the first pattern and the second pattern.

In accordance with another aspect of the disclosure, a method performed by a second terminal in a wireless communication system includes receiving, from a first terminal on a PSBCH, slot format information for a sidelink communication, the slot format information including first information on a number of patterns, second information on a period of pattern, and third information on a number of uplink slots of pattern, and performing, with the first terminal, the sidelink communication in at least one sidelink resource identified based on the first information, the second information, and the third information, wherein, in case that the first information indicates the number of the patterns as 1, the second information indicates the period of pattern for a pattern, and the third information indicates the number of uplink slots for the pattern, and wherein, in case that the first information indicates the number of the patterns as 2, the second information indicates the period for a first pattern and a second pattern, and the third information indicates the number of uplink slots for the first pattern and the second pattern.

In accordance with another aspect of the disclosure, a first terminal includes a transceiver configured to transmit and receive a signal, and a controller configured to transmit, to a second terminal on a PSBCH, slot format information for a sidelink communication, the slot format information including first information on a number of patterns, second information on a period of pattern, and third information on a number of uplink slots of pattern, and perform, with the second terminal, the sidelink communication in at least one sidelink resource identified based on the first information, the second information, and the third information, wherein, in case that the first information indicates the number of patterns as 1, the second information indicates the period of pattern for a pattern, and the third information indicates the number of uplink slots for the pattern, and wherein, in case that the first information indicates the number of patterns as 2, the second information indicates the period for a first pattern and a second pattern, and the third information indicates the number of uplink slots for the first pattern and the second pattern.

In accordance with another aspect of the disclosure, a second terminal includes a transceiver configured to transmit and receive a signal, and a controller configured to receive, from a first terminal on a PSBCH, slot format information for a sidelink communication, the slot format information including first information on a number of patterns, second information on a period of pattern, and third information on a number of uplink slots of pattern, and perform, with the first terminal, the sidelink communication in at least one sidelink resource identified based on the first information, the second information, and the third information, wherein, in case that the first information indicates the number of patterns as 1, the second information indicates the period of pattern for a pattern, and the third information indicates the number of uplink slots for the pattern, and wherein, in case that the first information indicates the number of the patterns as 2, the second information indicates the period for a first pattern and a second pattern, and the third information indicates the number of uplink slots for the first pattern and the second pattern.

BRIEF DESCRIPTION OF THE DRAWINGS

The above and other aspects, features and advantages of certain embodiments of the disclosure will be more apparent from the following detailed description, taken in conjunction with the accompanying drawings, in which:

FIG. 7A illustrates a method for transmitting a sidelink synchronization signal according to a first embodiment;

FIG. 10 illustrates the number of uplink-downlink symbols occupied by 14 symbols constituting one slot according to an embodiment;

DETAILED DESCRIPTION

Figure 1A:
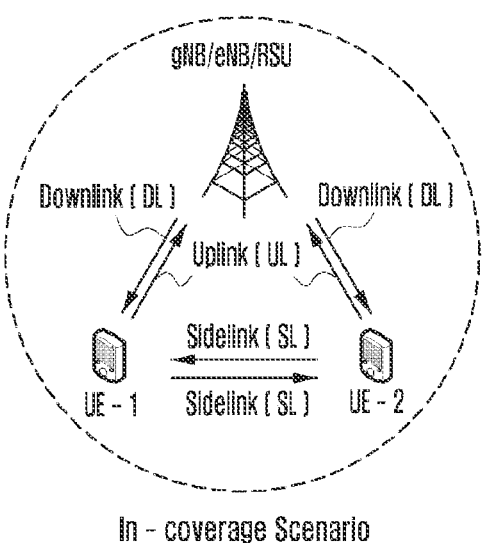
FIGS. 1A, 1B, 1C and 1D illustrate systems to which the disclosure is applied.

Embodiments of the disclosure will be described in detail with reference to the accompanying drawings. Detailed descriptions of known functions and/or configurations will be omitted for the sake of clarity and conciseness.

Some elements in the drawings may be exaggerated, omitted, or schematically illustrated, and the size of each element does not entirely reflect the actual size. In the drawings, the same or corresponding elements are denoted by the same reference numerals.

The advantages and features of the disclosure and the manner of achieving them will become apparent through embodiments described below with reference to the accompanying drawings. The disclosure may be embodied in various forms and should not be construed as being limited to the embodiments set forth herein. Rather, these embodiments are provided as examples to fully convey the scope of the disclosure to those skilled in the art.

The disclosure will be described focusing on an NR network and a packet core (i.e., a 5G system (5GS), a 5G core network, or a next generation (NG) core) according to the 5G mobile communication standard specified by the 3GPP mobile communication standardization organization. However, the subject matter of the disclosure can be also applied to other communication systems having similar technical backgrounds through slight modification without departing from the scope of the disclosure.

In the 5G system, a network data collection and analysis function (NWDAF) of collecting, analyzing, and providing data in the 5G network, may be defined to support network automation. The NWDAF may collect information from the 5G network, store and analyze the collected information, and provide a result of analysis to an unspecified network function (NF). The result of analysis may be used independently in each NF.

Some terms and names defined in the 3GPP standards will be used for the convenience of description. However, the disclosure is not limited by such terms and names and may be also applied to any other system that complies with any other standard.

Terms for identifying access nodes and referring to network entities, messages, interfaces between network entities, and various identification information, are illustratively used for the sake of convenience. Therefore, the disclosure is not limited by the terms as used below, and other terms referring to subjects having equivalent technical meanings may be used.

Many services may be provided to users in the 5G communication system. To do so, a method and apparatus for providing respective services within the same time interval are required. One of such services provided in the 5G communication system is a service that satisfies requirements of low latency and high reliability.

In a vehicular communication, LTE-based V2X communication has been standardized in 3GPP Rel-14 and Rel-15, based on a D2D communication structure. Efforts are being made to develop 5G NR-based V2X communication, in which support for unicast communication, groupcast (or multicast) communication, and broadcast communication will be available between terminals. Unlike the LTE V2X communication that aims to transmit and receive basic safety information required for road driving of a vehicle, the NR V2X communication aims to provide more advanced services, such as platooning, advanced driving, extended sensors, and remote driving.

The aforesaid advanced services require a high data rate, so that the 5G NR V2X system may need a relatively wide bandwidth compared to the conventional 4G LTE V2X system. Thus, it is necessary to support operation in a high frequency band and solve a coverage issue caused by frequency characteristics through analog beamforming.

In such an analog beamforming system, a method and apparatus for acquiring beam information between a transmitting terminal and a receiving terminal are required.

FIGS. 1A, 1B, 1C and 1D illustrate systems to which the disclosure is applied.

FIG. 1A shows an in-coverage scenario in which all V2X terminals, i.e., UE-1 and UE-2, are located within the coverage of a base station (gNB, eNB, road side unit (RSU)).

All the V2X UEs are capable of receiving data and control information from the base station through a downlink (DL) and transmitting data and control information to the base station through an uplink (UL). Such data and control information may be available for V2X communication or for general cellular communication. In addition, the V2X UEs may transmit and receive data and control information for V2X communication through a sidelink (SL).

Figure 1B:
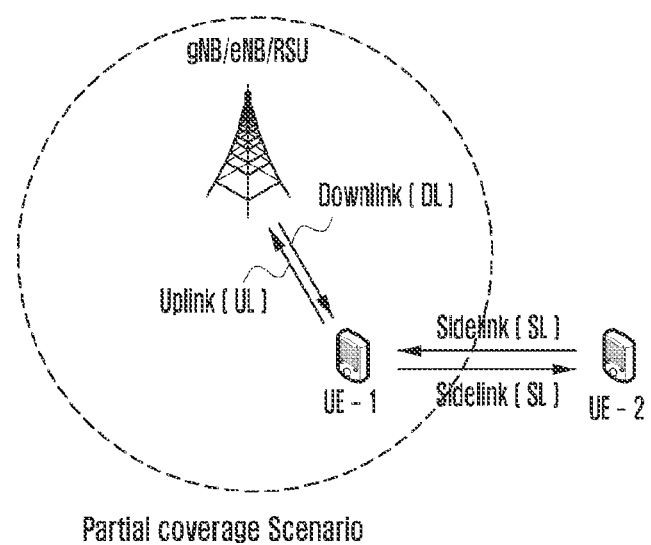

FIG. 1B shows a partial-coverage scenario in which, among the V2X UEs, UE-1 is located within the coverage of a base station and UE-2 is located out of the coverage.

UE-1 located within the coverage of the base station is capable of receiving data and control information from the base station through a downlink and transmitting data and control information to the base station through an uplink.

UE-2 located out of the coverage of the base station is incapable of receiving data and control information from the base station through the downlink and transmitting data and control information to the base station through the uplink.

UE-2 may transmit and receive data and control information for V2X communication to and from UE-1 through a sidelink.

Figure 1C:
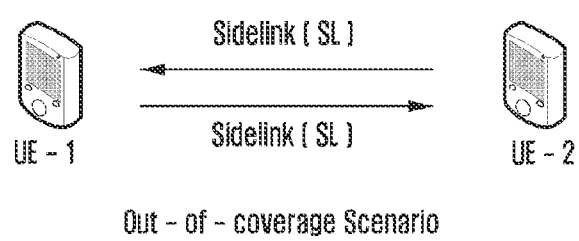

FIG. 1C shows an out-of-coverage scenario in which all V2X UEs are located out of the coverage of a base station.

In scenario (c), UE-1 and UE-2 are incapable of receiving data and control information from the base station through a downlink and transmitting data and control information to the base station through an uplink.

UE-1 and UE-2 may transmit and receive data and control information for V2X communication through a sidelink.

Figure 1D:
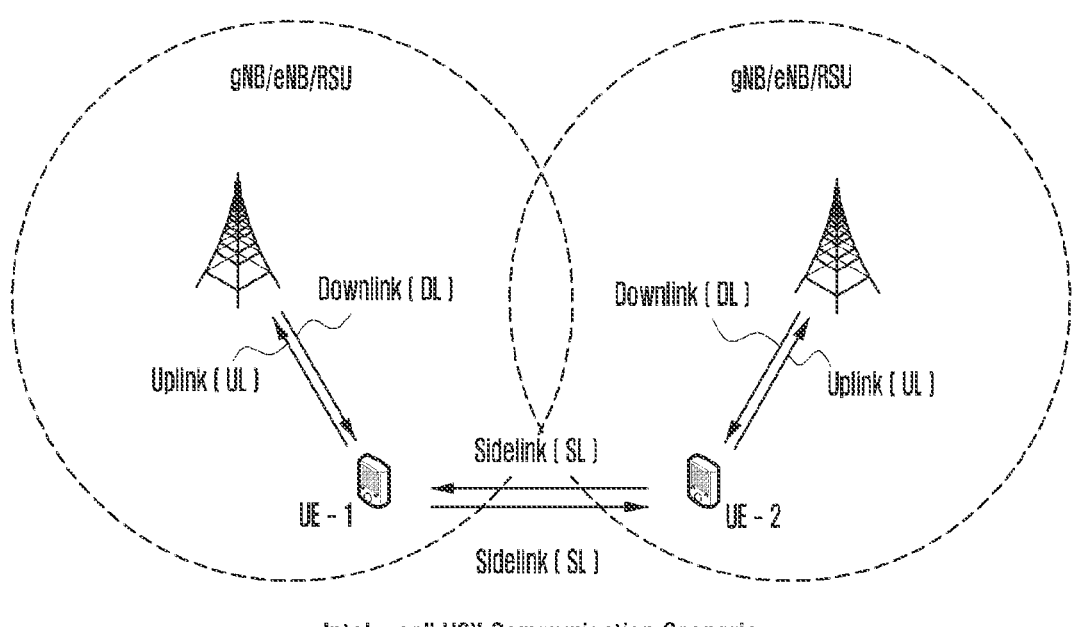

FIG. 1D shows an inter-cell V2X communication scenario in which UEs located in different cells perform V2X communication with each other. Specifically, in scenario (d), a V2X transmitting UE and a V2X receiving UE are connected to different base stations (i.e., a radio resource control (RRC) connected state) or camp on difference cells (i.e., an RRC connection released state or an RRC idle state). In this scenario, UE-1 may be the V2X transmitting UE, and UE-2 may be the V2X receiving UE. Alternatively, UE-1 may be the V2X receiving UE, and UE-2 may be the V2X transmitting UE. UE-1 may receive a V2X-dedicated system information block (SIB) from a base station to which UE-1 is connected (or from a base station of a cell on which UE-1 camps), and UE-2 may receive a V2X-dedicated SIB from another base station to which UE-2 is connected (or from a base station of a cell on which UE-2 camps). Information of the V2X-dedicated SIB received by UE-1 and information of the V2X-dedicated SIB received by UE-2 may be identical with or different from each other. In the latter case, UE-1 and UE-2 may receive different information for sidelink communication from their connected (or camping-on) base stations, respectively. In this case, there is a need to unify information in order to perform sidelink communication between UEs located in different cells.

Although FIGS. 1A, 1B, 1C and 1D illustrates a V2X system composed of two UEs, UE-1 and UE-2, for convenience of description, this is merely an example. In addition, an uplink and a downlink between a base station and a V2X UE may be referred to as a Uu interface, and a sidelink between V2X UEs may be referred to as a PC5 interface. Therefore, the terms may be used interchangeably in the disclosure.

Herein, a terminal, used interchangeably with a UE, may refer to a device that supports device-to-device (D2D) communication, a vehicle that supports vehicle-to-vehicle (V2V) communication, a vehicle or a pedestrian's handset (e.g., a smartphone) that supports vehicle-to-pedestrian (V2P) communication, a vehicle that supports vehicle-to-network (V2N) communication, or a vehicle that supports vehicle-to-infrastructure (V2I) communication. In addition, the terminal or UE may refer to an RSU having a UE function, an RSU having a base station function, or an RSU having a part of the base station function and a part of the UE function.

The V2X communication may refer to D2D communication, V2V communication, or V2P communication, and may be used interchangeably with sidelink communication.

A base station may support both V2X communication and a general cellular communication, or may support only V2X communication. In addition, the base station may refer to a 5G base station (i.e., gNB), a 4G base station (i.e., eNB), or an RSU. Therefore, unless otherwise specified in the disclosure, the above terms related to the base station may be used interchangeably.

Figure 2A:
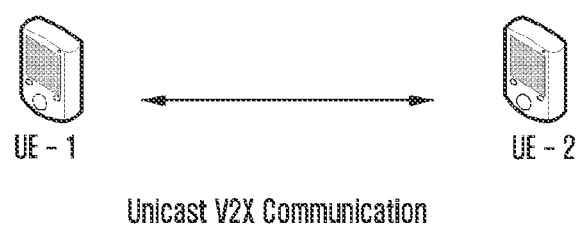
FIGS. 2A and 2B illustrate a vehicle-to-everything (V2X) communication method performed through a sidelink to which the disclosure is applied.
Figure 2B:
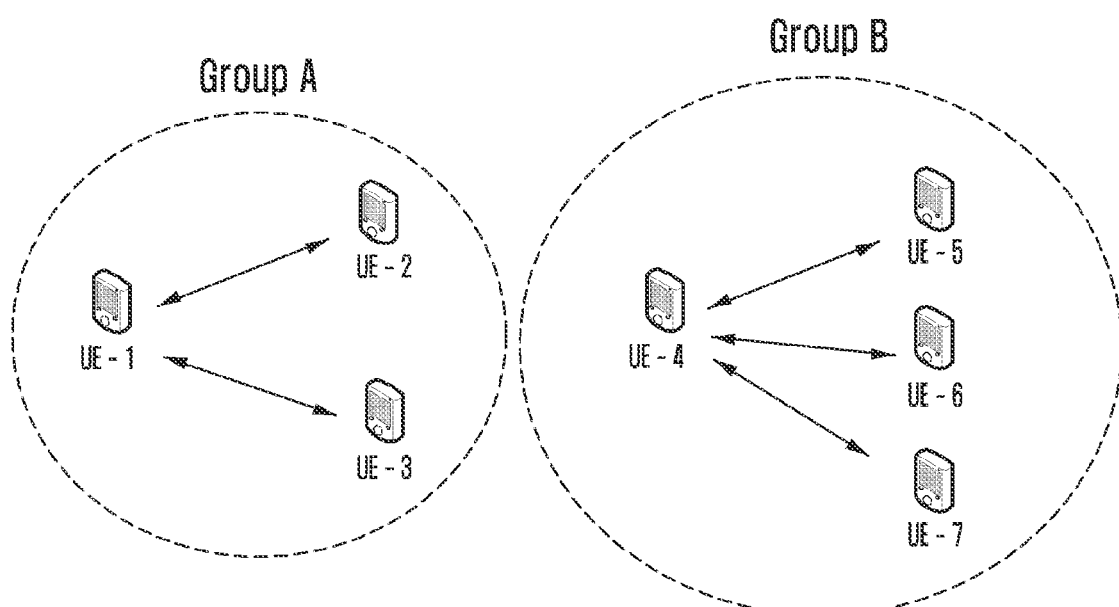

FIGS. 2A and 2B illustrate a V2X communication method performed through a sidelink to which the disclosure is applied.

As shown in FIG. 2A, a transmitting UE (UE-1) and a receiving UE (UE-2) may perform one-to-one communication, which may be referred to as unicast communication.

In FIG. 2B, a transmitting UE (UE-1 or UE-4) and receiving UEs (UE-2 and UE-3, or UE5, UE-6, and UE-7) may perform one-to-many communication, which may be referred to as groupcast or multicast communication.

In FIG. 2B, UE-1, UE-2, and UE-3 form one group (group A) and perform groupcast communication, and UE-4, UE-5, UE-6, and UE-7 form another group (group B) and perform another groupcast communication. Each UE only performs groupcast communication within a group. Communication between groups may be performed via unicast, groupcast, or broadcast communication. Although FIG. 2B illustrates two groups, the disclosure is not limited thereto.

V2X UEs may perform broadcast communication, in which all V2X UEs receive data and control information transmitted by a V2X transmitting UE through a sidelink. For example, in FIG. 2B, when it is assumed that UE-1 is a transmitting UE for broadcast, all the other UEs (i.e., UE-2, UE-3, UE-4, UE-5, UE-6, and UE-7) may be receiving UEs that receive data and control information transmitted by the UE-1.

Sidelink unicast, groupcast, and broadcast communication methods according to embodiments of the disclosure may be supported in in-coverage, partial-coverage, and out-of-coverage scenarios.

In a sidelink system, resource allocation may use the following methods.

(1) Mode 1 Resource Allocation

This refers to a method of resource allocation scheduled by a base station (scheduled resource allocation). Specifically, the base station may allocate resources used for sidelink transmission to RRC-connected UEs in a dedicated scheduling scheme. The scheduled resource allocation method may be effective for interference management and resource pool management (e.g., dynamic allocation and/or semi-persistent scheduling (SPS)) because the base station can manage the resources of a sidelink. When there is data to be transmitted to other UE(s), the RRC connected mode UE may use an RRC message or a medium access control (MAC) control element (CE) to inform the base station that there is data to be transmitted to other UE(s). For example, the RRC message may be a sidelink UE information (SidelinkUEInformation) message or a UE assistance information (UEAssistanceInformation) message. In addition, the MAC CE may be a buffer status report (BSR) MAC CE, scheduling request (SR), etc. including at least one of an indicator indicating a BSR for V2X communication and information on the size of data buffered for sidelink communication. Because resources are scheduled for the sidelink transmitting UE by the base station, the mode 1 resource allocation method can be applied when the V2X transmitting UE is within the coverage of the base station.

(2) Mode 2 Resource Allocation

Mode 2 allows the sidelink transmitting UE to autonomously select resources (UE autonomous resource selection). Specifically, the base station provides a sidelink transmitting/receiving resource pool for the sidelink to the UE through system information or an RRC message (e.g., RRCReconfiguration message or a PC5-RRC message), and the transmitting UE that receives the transmitting/receiving resource pool selects a resource pool and a resource in accordance with a predetermined rule. Because the base station provides configuration information on the sidelink transmitting/receiving resource pool, the mode 2 resource allocation method can be applied when the sidelink transmitting UE and receiving UE are within the coverage of the base station. If the sidelink transmitting UE and receiving UE exist outside the coverage of the base station, both UEs may perform the mode 2 operation in a preconfigured transmitting/receiving resource pool. The UE autonomous resource selection method may include zone mapping, sensing-based resource selection, random selection, and the like.

(3) Even if the UEs exist in the coverage of the base station, resource allocation or resource selection may not be performed in the scheduled resource allocation mode or the UE autonomous resource selection mode. In this case, the UE may perform sidelink communication through a preconfigured sidelink transmitting/receiving resource pool.

Figure 3:
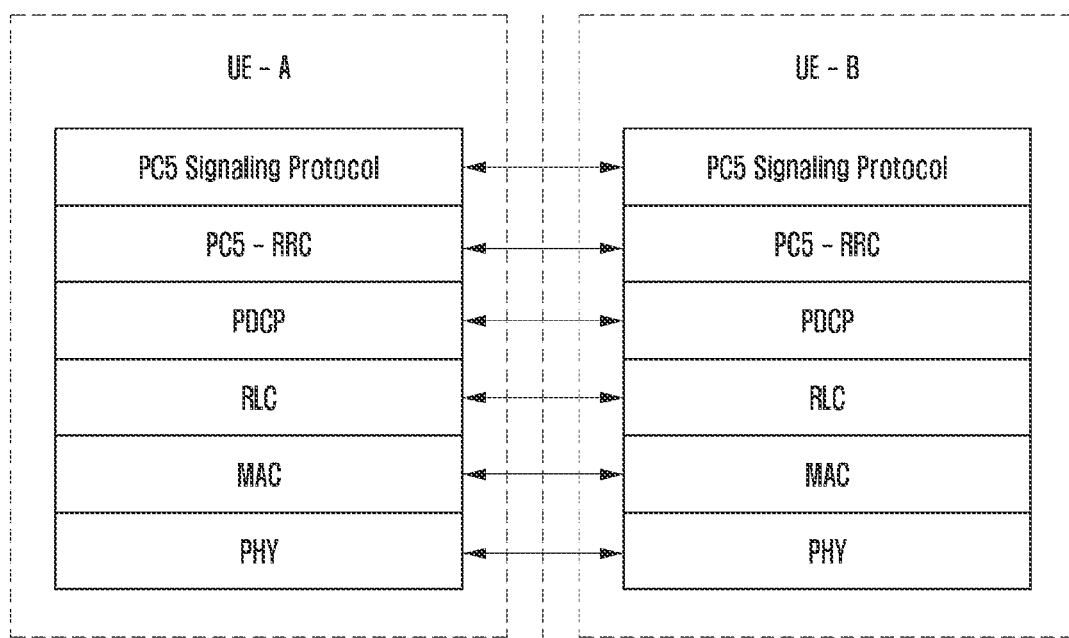
FIG. 3 illustrates a protocol of a sidelink terminal to which the disclosure is applied.

FIG. 3 illustrates a protocol of a sidelink terminal to which the disclosure is applied.

Application layers of UE-A and UE-B may perform a service discovery of which sidelink communication scheme (unicast, groupcast, or broadcast) each UE will perform. In FIG. 3, it is assumed that UE-A and UE-B recognize through a service discovery process performed in their application layers that they will perform a unicast communication scheme. The sidelink UEs may acquire information on a source identifier (ID) and a destination ID for sidelink communication in the service discovery process.

When the service discovery process is completed, a PC-5 signaling protocol layer shown in FIG. 3 may perform a D2D direct link connection setup procedure. In this case, security setup information for D2D direct communication may be exchanged.

When the D2D direct link connection setup procedure is completed, a D2D PC-5 RRC setup procedure may be performed in a PC-5 RRC layer of FIG. 3. In this case, information on the capabilities of UE-A and UE-B may be exchanged, and access stratum (AS) layer parameter information for unicast communication may be exchanged.

When the PC-5 RRC setup procedure is completed, UE-A and UE-B can perform unicast communication.

Although unicast communication is described above as an example, it can be extended to groupcast communication. For example, when UE-A, UE-B, and UE-C perform groupcast communication, UE-A and UE-B may perform the service discovery for unicast communication, the D2D direct link setup procedure, and the PC-5 RRC setup procedure as described above. In addition, UE-A and UE-C may perform the service discovery for unicast communication, the D2D direct link setup procedure, and the PC-5 RRC setup procedure. Similarly, UE-B and UE-C may perform the service discovery for unicast communication, the D2D direct link setup procedure, and the PC-5 RRC setup procedure. That is, instead of performing a separate PC-5 RRC setup procedure for groupcast communication, each pair of transmitting/receiving UEs participating in groupcast communication may perform the PC-5 RRC setup procedure for unicast communication. However, in the groupcast method, it may not always be necessary to perform the PC5 RRC setup procedure for unicast communication. For example, there may be scenario of groupcast communication performed without PC5 RRC connection setup, in which case the PC5 RRC setup procedure for unicast transmission may be omitted.

The PC-5 RRC setup procedure for unicast or groupcast communication can be applied to all of in-coverage, partial coverage, and out-of-coverage scenarios shown in FIG. 1. When UEs to perform unicast or groupcast communication exist within the coverage of a base station, the UEs may perform the PC-5 RRC setup procedure before or after performing downlink or uplink synchronization with the base station.

Figure 4:
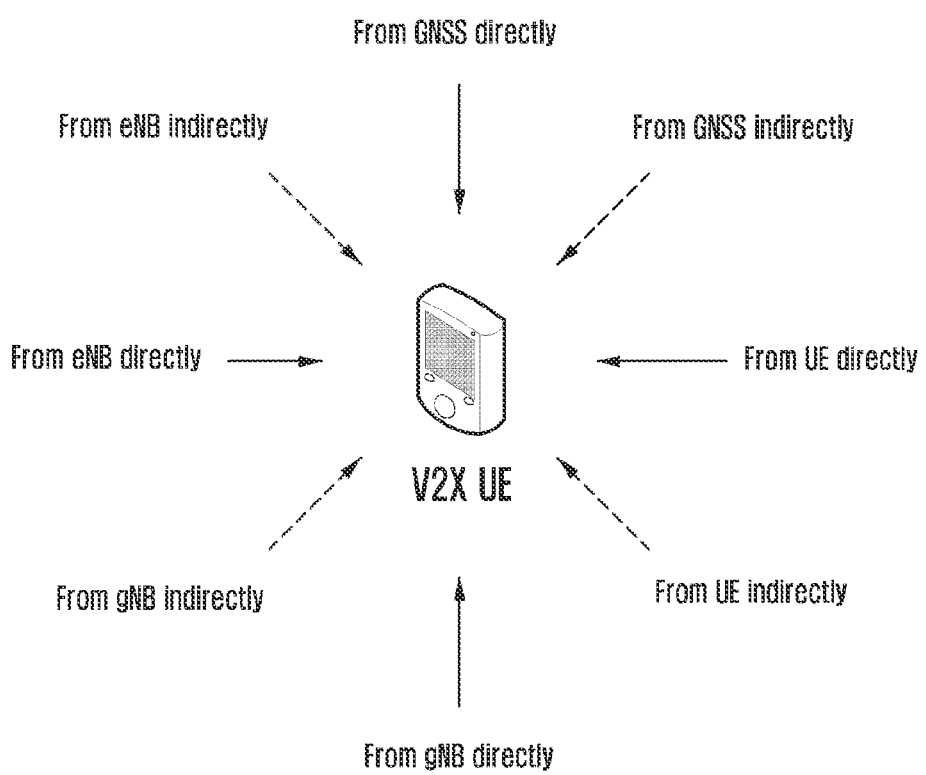
FIG. 4 illustrates types of synchronization signals that can be received by a sidelink terminal to which the disclosure is applied.

FIG. 4 illustrates types of synchronization signals that can be received by a sidelink terminal to which the disclosure is applied.

Specifically, the following sidelink synchronization signals may be received from various sidelink synchronization sources.

The sidelink UE may directly receive a synchronization signal from a global navigation satellite system (GNSS) or a global positioning system (GPS).
In this case, the sidelink synchronization source may be the GNSS.
The sidelink UE may indirectly receive a synchronization signal from the GNSS or the GPS.
Indirectly receiving a synchronization signal from the GNSS may refer to a case in which sidelink UE-A receives a sidelink synchronization signal (SLSS) transmitted by sidelink UE-1 that directly synchronizes with the GNSS. In this case, the sidelink UE-A may receive a synchronization signal from the GNSS through a 2-hop. In another example, sidelink UE-2 that synchronizes with a sidelink synchronization signal (SLSS) transmitted by sidelink UE-1 synchronizing with the GNSS may transmit the SLSS. Upon receiving this, sidelink UE-A may receive a synchronization signal from the GNSS through a 3-hop. Similarly, sidelink UE-A may receive a synchronization signal from the GNSS through more than a 3-hop.
In this case, the sidelink synchronization source may be another sidelink UE that has synchronized with the GNSS.
The sidelink UE may directly receive a synchronization signal from an LTE base station (i.e., eNB).
The sidelink UE may directly receive a primary synchronization signal (PSS)/secondary synchronization signal (SSS) transmitted from the eNB.
In this case, the sidelink synchronization source may be the eNB.
The sidelink UE may indirectly receive a synchronization signal from the LTE base station (i.e., eNB).
Indirectly receiving a synchronization signal from the eNB may refer to a case in which sidelink UE-A receives an SLSS transmitted by sidelink UE-1 that directly synchronizes with the eNB. In this case, the sidelink UE-A may receive a synchronization signal from the eNB through a 2-hop. In another example, sidelink UE-2 that synchronizes with an SLSS transmitted by sidelink UE-1 synchronizing with the eNB may transmit the SLSS. Upon receiving this, sidelink UE-A may receive a synchronization signal from the eNB through a 3-hop. Similarly, sidelink UE-A may receive a synchronization signal from the eNB through more than a 3-hop.
In this case, the sidelink synchronization source may be another sidelink UE that has synchronized with the eNB.
The sidelink UE may indirectly receive a synchronization signal from an NR base station (i.e., gNB).
Indirectly receiving a synchronization signal from the gNB may refer to a case in which sidelink UE-A receives an SLSS transmitted by sidelink UE-1 that directly synchronizes with the gNB. In this case, the sidelink UE-A may receive a synchronization signal from the gNB through a 2-hop. In another example, sidelink UE-2 that synchronizes with an SLSS transmitted by sidelink UE-1 synchronizing with the gNB may transmit the SLSS. Upon receiving this, sidelink UE-A may receive a synchronization signal from the gNB through 3-hop. Similarly, sidelink UE-A may receive a synchronization signal from the gNB through more than a 3-hop.
In this case, the sidelink synchronization source may be another sidelink UE that has synchronized with the gNB.
The sidelink UE-A may directly receive a synchronization signal from another sidelink UE-B.
When the sidelink UE-B fails to detect the SLSS transmitted from the GNSS, the gNB, the eNB, or another sidelink UE as the sidelink synchronization source, the sidelink UE-B may transmit the SLSS based on its own timing. The sidelink UE-A may directly receive the SLSS transmitted by the sidelink UE-B.
In this case, the sidelink synchronization source may be a sidelink UE.
The sidelink UE-A may indirectly receive a synchronization signal from another sidelink UE-B.
Indirectly receiving a synchronization signal from the sidelink UE-B may refer to a case in which sidelink UE-A receives an SLSS transmitted by sidelink UE-1 that directly synchronizes with the sidelink UE-B. In this case, the sidelink UE-A may receive a synchronization signal from the sidelink UE-B through a 2-hop. In another example, sidelink UE-2 that synchronizes with an SLSS transmitted by sidelink UE-1 synchronizing with the sidelink UE-B may transmit the SLSS. Upon receiving this, sidelink UE-A may receive a synchronization signal from the sidelink UE-B through a 3-hop. Similarly, sidelink UE-A may receive a synchronization signal from the sidelink UE-B through more than a 3-hop.
In this case, the sidelink synchronization source may be another sidelink UE that has synchronized with one sidelink UE.

As such, the sidelink UE may receive a synchronization signal from the above-described various synchronization sources and may perform synchronization on a synchronization signal transmitted from a synchronization source having a higher priority according to preconfigured priorities.

For example, in the order from a synchronization signal having a higher priority to a synchronization signal having a lower priority, the following priorities may be preconfigured.

Case A
1) Synchronization signal transmitted by GNSS>2) Synchronization signal transmitted by UE that performs synchronization directly from GNSS>3) Synchronization signal transmitted by UE that performs synchronization indirectly from GNSS>4) Synchronization signal transmitted by eNB or gNB>5) Synchronization signal transmitted by UE that performs synchronization directly from eNB or gNB>6) Synchronization signal transmitted by UE that performs synchronization indirectly from eNB or gNB>7) Synchronization signal transmitted by UE that does not perform direct or indirect synchronization with GNSS, eNB, or gNB.

2)

Case A is an example of a synchronization signal transmitted by the GNSS having the highest priority. Alternatively, cases where a synchronization signal transmitted by the eNB or the gNB has the highest priority may be considered, and the following priorities may be preconfigured.

Case B

1) Synchronization signal transmitted by eNB or gNB>2) Synchronization signal transmitted by UE that performs synchronization directly from eNB or gNB>3) Synchronization signal transmitted by UE that performs synchronization indirectly from eNB or gNB>4) Synchronization signal transmitted by GNSS>5) Synchronization signal transmitted by UE that performs synchronization directly from GNSS>6) Synchronization signal transmitted by UE that performs synchronization indirectly from GNSS>7) Synchronization signal transmitted by UE that does not perform direct or indirect synchronization with GNSS, eNB, or gNB.

Whether sidelink UE should follow the Case A priorities or the Case B priorities may be configured from a base station or may be preconfigured. Specifically, when the sidelink UE exists in the coverage of the base station (i.e., in-coverage), the base station may configure, through system information (e.g., SIB) or RRC signaling, whether the sidelink UE should follow the Case A priorities or the Case B priorities. If the sidelink UE exists outside the coverage of the base station (i.e., out-of-coverage), whether the sidelink UE should follow the Case A priorities or the Case B priorities may be preconfigured.

When the base station configures Case A to the sidelink UE through system information or RRC signaling, the base station may further configure whether or not, in Case A, the sidelink UE considers priority 4 (synchronizing with a synchronization signal transmitted by eNB or gNB), priority 5 (synchronizing with a synchronization signal transmitted by UE that performs synchronization directly from eNB or gNB), and priority 6 (synchronizing with a synchronization signal transmitted by UE that performs synchronization indirectly from eNB or gNB). That is, when Case A is configured and it is further configured to consider priority 4, priority 5, and priority 6, all priorities of Case A (i.e., from priority 1 to priority 7) will be considered. In contrast, when Case A is configured and it is not configured to consider priority 4, priority 5, and priority 6, or when Case A is configured and it is further configured to do not consider priority 4, priority 5, and priority 6, all of priority 4, priority 5, and priority 6 will be omitted from Case A (that is, only priority 1, priority 2, priority 3, and priority 7 are considered).

In the disclosure, the sidelink synchronization signal may refer to a sidelink synchronization signal block (S-SSB). In addition, the S-SSB may be composed of a sidelink primary synchronization signal (S-PSS), a sidelink secondary synchronization signal (S-SSS), and a physical sidelink broadcast channel (PSBCH). The S-PSS may be composed of a Zadoff-Chu sequence or an M-sequence, and the S-SSS may be composed of an M-sequence or a gold sequence. Similar to PSS/SSS in the cellular system, a sidelink ID may be transmitted through a combination of the S-PSS and the S-SSS or through only the S-SSS. Similar to a physical broadcast channel (PBCH) of the cellular system, the PSBCH may transmit master information block (MIB) for sidelink communication.

In the disclosure, a case where a sidelink parameter is preconfigured in a sidelink UE may be mainly applied to when the sidelink UE is located outside the coverage of a base station (out-of-coverage scenario). The meaning that the parameter is preconfigured in the UE may be interpreted as using a default value embedded in the UE when the UE is manufactured. In other examples, this may indicate that the sidelink UE accesses the base station and obtains and stores the sidelink parameter information in advance through RRC configuration, or that the sidelink UE obtains and stores the sidelink system information in advance from the base station, even though the sidelink UE does not access the base station.

Figure 5:
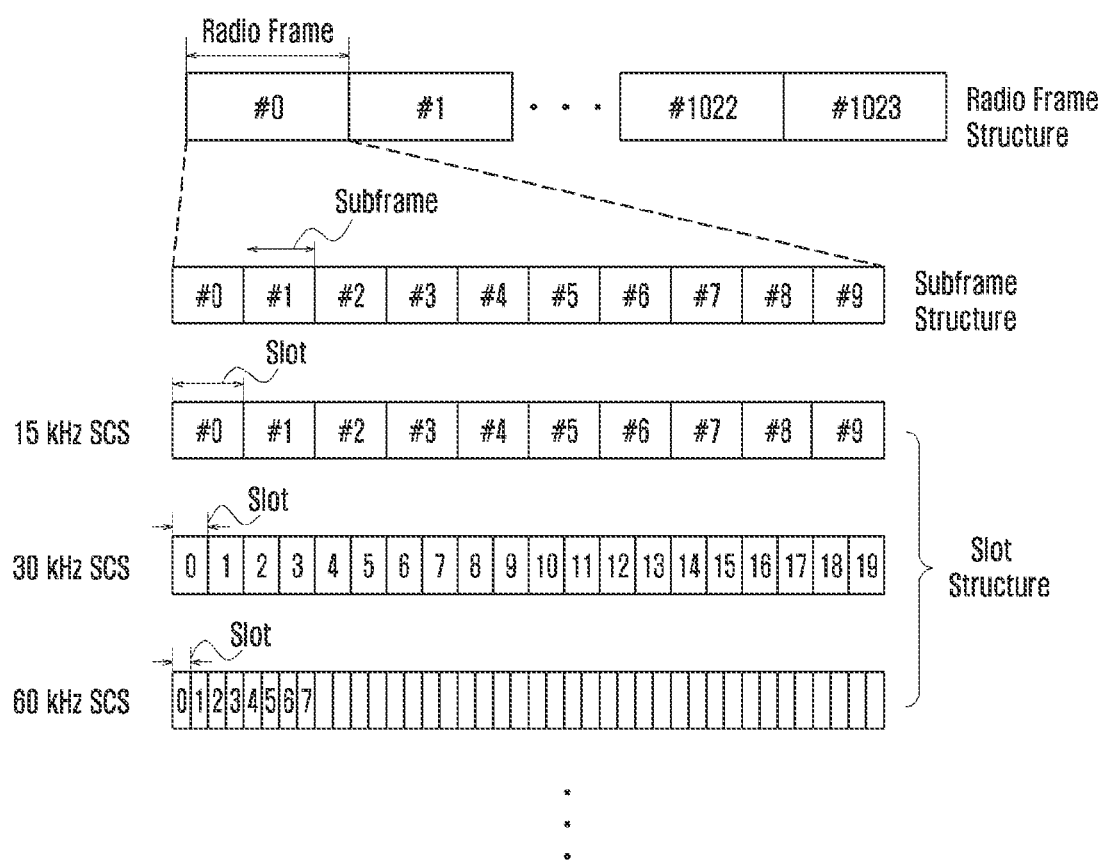
FIG. 5 illustrates a frame structure of a sidelink system according to an embodiment.

FIG. 5 illustrates a frame structure of a sidelink system according to an embodiment.

FIG. 5 shows that the system operates 1024 radio frames, but this is merely an example. For example, a certain system may operate fewer or more radio frames than 1024, and the amount of radio frames the system operates may be configured by a base station or may be preconfigured. Specifically, when sidelink UE is located in the coverage of the base station, the sidelink UE may obtain information on the radio frame through an MIB of PBCH transmitted by the base station. When sidelink UE is located outside the coverage of the base station, information on the radio frame may be preconfigured in the sidelink UE.

In FIG. 5, a radio frame number and a system frame number may be treated equally. That is, the radio frame number '0' may correspond to the system frame number '0', and the radio frame number '1' may correspond to the system frame number '1'. One radio frame may consist of 10 subframes, and one subframe may have a length of 1 millisecond (ms) on the time axis. The number of slots constituting one subframe may vary as shown in FIG. 5, depending on the subcarrier spacing used in the NR V2X. For example, when a 15 kilohertz (kHz) subcarrier spacing is used in the NR V2X communication, one subframe may be equal to one slot. However, when using a 30 kHz subcarrier spacing and a 60 kHz subcarrier spacing in the NR V2X communication, one subframe may be equal to two slots and four slots, respectively. This may be applied even when the subcarrier spacing of 120 kHz or more is used. That is, the number of slots constituting one subframe may generally increase to '2n' as the subcarrier spacing increases based on 15 kHz, where 'n' is 0, 1, 2, 3, and the like.

Figure 6:
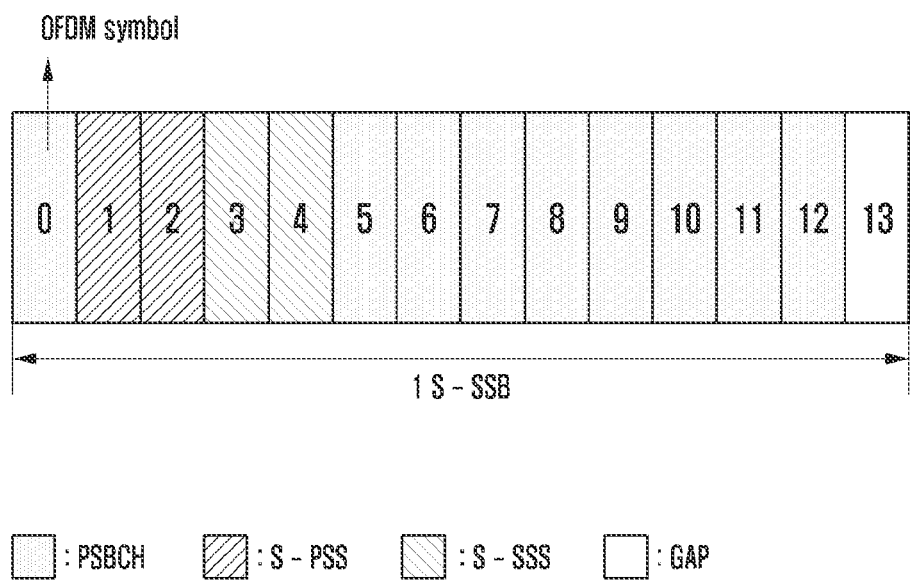
FIG. 6 illustrates a structure of a sidelink synchronization channel according to an embodiment.

FIG. 6 illustrates a structure of a sidelink synchronization channel according to an embodiment.

The sidelink synchronization channel may be represented by being replaced with an S-SSB), and one S-SSB may consist of 14 symbols as shown in FIG. 6. In addition, one S-SSB may be composed of an S-PSS, an S-SSS, a PSBCH, and a guard period (GAP). In this case, each of S-PSS and S-SSS may be composed of two OFDM symbols, PSBCH may be composed of nine OFDM symbols, and GAP may be composed of one OFDM symbol.

As shown in FIG. 6, S-PSS may be mapped to OFDM symbol indices 1 and 2, S-SSS may be mapped to OFDM symbol indices 3 and 4, and GAP may be mapped to the last OFDM symbol of the S-SSB (i.e., OFDM symbol index 13). PSBCH may be mapped to the remaining OFDM symbols except for S-PSS, S-SSS, and GAP. Although FIG. 6 shows that S-PSS and S-SSS are located in consecutive symbols, S-PSS and S-SSS may be located apart from each other with one symbol interposed therebetween. That is, S-PSS may be mapped to OFDM symbol indices 1 and 2, S-SSS may be mapped to OFDM symbol indices 4 and 5, and PSBCH may be mapped to OFDM symbol indices 0, 3, 6, 7, 8, 9, 10, 11, and 12. A demodulation reference signal (DMRS) may be transmitted in each OFDM symbol to which the PSBCH is mapped.

Information transmitted through the PSBCH may include at least one of the following pieces of information.

1. Frame Number: This may indicate a frame number through which S-SSB (i.e., S-PSS, S-SSS, and PSBCH) is transmitted. When a sidelink UE transmitting the S-SSB is located within the coverage of a base station, the frame number may be configured based on a system frame number of the base station where the sidelink UE is located. When a sidelink UE transmitting the S-SSB is located outside the coverage of a base station, the frame number may be preconfigured based on a frame number of the UE transmitting the S-SSB. The frame number may be formed of 10 bits.

2. Downlink and Uplink Configuration Information: As shown in FIG. 1B, a sidelink UE-1 located within the coverage of a base station can perform sidelink communication with a sidelink UE-2 located outside the coverage of the base station (i.e., partial-coverage scenario). In FIG. 1B, the base station where UE-1 is located may be operating as a time division duplexing (TDD) system. In this case, sidelink signals transmitted by UE-2 and other UEs, although not shown in FIG. 1B, located outside the coverage of the base station may cause interference.

Specifically, when UE-1 receives control information and data information from the base station through downlink, sidelink control information and data information transmitted by UE-2 may cause interference to downlink signals received by UE-1. In FIG. 1B, if UE-1 is located at the edge of the coverage of the base station (that is, UE-1 is far from the base station), and UE-2 is located adjacent to UE-1, the interference problem may become serious. However, when UE-1 transmits control information and data information to the base station through uplink, sidelink control information and data information transmitted by UE-2 may cause interference to uplink signals of UE-1 received by the base station. Because UE-2 is farther away from the base station than UE-1, signals received from UE-2 at a receiver of the base station may not cause much interference to signals received from UE-1. In addition, because the base station can have more reception antennas compared to a receiver of UE-1, the base station may use more advanced reception techniques such as interference cancellation. Therefore, when comparing the case where UE-2's signals cause interference to UE-1's receiver and the case where UE-2's signals cause interference to the base station's receiver, the former case may have a greater effect on system performance.

In order to solve the above interference problem in the TDD system, the sidelink UE that transmits the S-SSB within the coverage of the base station may transmit TDD configuration information (i.e., downlink and uplink configuration information to be followed by all UEs located within the coverage of the base station), set by the base station, to another sidelink UE located outside the coverage of the base station through PSBCH. The sidelink UE located outside the coverage of the base station and receiving the above information through the PSBCH may configure a resource pool for transmitting and receiving sidelink control information and data information by using only an uplink subframe or an uplink slot except for a downlink subframe, a special subframe, a downlink slot, and a flexible slot.

3. Slot Index: As shown in FIG. 5, one system frame may consist of a plurality of subframes. In addition, depending on the subcarrier spacing, one subframe may consist of a plurality of slots. Therefore, an indicator that indicates which slot of the indicated frame number is used for transmitting the S-SSB may be required. The slot index may refer to information indicating the index of a slot through which the S-SSB is transmitted in a frame index indicated by the frame number. For example, the subcarrier spacing of 15 kHz, 30 kHz, 60 kHz, or 120 kHz may be composed of 10 slots, 20 slots, 40 slots, or 80 slots within one frame formed of 10 ms. Thus, 7 bits may be required to transmit 80 slot indices.

4. Coverage Indicator: As described above in FIG. 4, when it is configured that the synchronization signal of the base station has a higher priority than that of the GNSS, the S-SSB transmitted by a sidelink UE directly synchronized from the base station may have a higher priority than the S-SSB transmitted by any other sidelink UE, that is, than the S-SSB transmitted by a sidelink UE directly or indirectly synchronized with the GNSS and the S-SSB transmitted by a sidelink UE directly or indirectly synchronized with the S-SSB transmitted by another sidelink UE. This may indicate that the timing of the base station is transmitted to a sidelink UE located outside the coverage of the base station through a sidelink UE located in the coverage of the base station. For determining the priority, a 1-bit indicator indicating a coverage state may be included in the PSBCH. For example, when the 1-bit indicator is set to '1', this may indicate that the sidelink UE transmitting the PSBCH is located within the coverage of the base station. In addition, when the 1-bit indicator is set to '0', this may indicate that the sidelink UE transmitting the PSBCH is located outside the coverage of the base station. Therefore, the sidelink UE that receives the PSBCH can determine whether the received S-SSB is transmitted from a sidelink UE located in the coverage of the base station or from a sidelink UE located outside the coverage of the base station. Based on this, it is possible to determine to which S-SSB the sidelink synchronization should be performed (i.e., selection of a sidelink synchronization source).

In addition to the above-mentioned information, the PSBCH may include a reserved bit that is not used in the current release. For example, the reserved bit formed of 2-bit or 1-bit may be included, which may be used for a later release UE. That is, the release 16 sidelink UE does not interpret the reserved bit, and if the reserved bit is used for the introduction of a new sidelink function in later release 17 and next release, the sidelink UE after release 17 may interpret the corresponding bit.

Figure 7B:
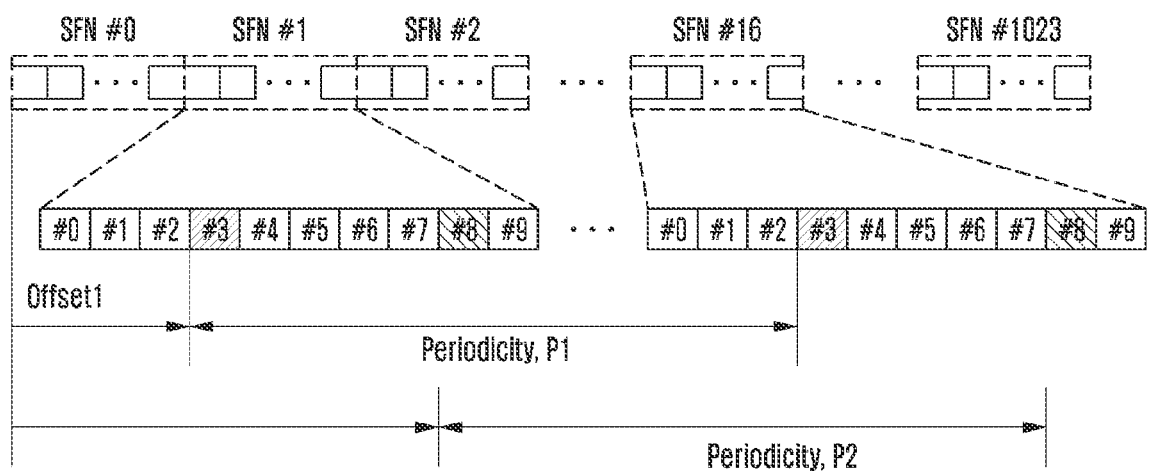
FIG. 7B illustrates a method for transmitting a sidelink synchronization signal according to a second embodiment.

FIG. 7A illustrates a method for transmitting a sidelink synchronization signal according to a first embodiment, and FIG. 7B illustrates a method for transmitting a sidelink synchronization signal according to a second embodiment.

In FIGS. 7A and 7B, for a sidelink synchronization source UE that transmits an S-SSB, information on a start point at which the S-SSB is transmitted may be configured from a base station or preconfigured. Specifically, when the sidelink synchronization source is located in the coverage of the base station (i.e., in-coverage), the base station may configure, through SIB or RRC configuration information, information on the start point where the sidelink synchronization source UE can transmit the S-SSB. In this case, the information on the S-SSB transmission start point may refer to an offset, and the offset may indicate a difference between slot #0 and a start slot of periodicity where the S-SSB is actually transmitted in a system frame number (SFN) #0 of the base station in which the UE to transmit the S-SSB is located, as shown in FIGS. 7A and 7B.

In contrast, when the sidelink synchronization source is located outside the coverage of the base station (i.e., out-of-coverage), information on the start point for transmitting the S-SSB may be preconfigured in the UE. In this case, the information on the S-SSB transmission start point may refer to an offset, and the offset may indicate a difference between slot #0 and a start slot of periodicity where the S-SSB is actually transmitted in a direct frame number (DFN) #0 of the UE to transmit the S-SSB.

FIG. 7A shows a case in which one offset is configured (or preconfigured), and FIG. 7B shows a case in which two offsets are configured (or preconfigured). Whether one or two offsets are configured may also indicate that one or two time resources for S-SSB transmission are configured. There may be a case in which three offsets are configured, which may indicate that three time resources for S-SSB transmission are configured. When the sidelink UE is located in the coverage of the base station, a time resource for S-SSB transmission may be configured to one at the most. When the sidelink UE is located outside the coverage of the base station, time resources for S-SSB transmission may be configured (or preconfigured) up to three (that is, two or three resources may be configured or preconfigured).

In FIGS. 7A and 7B, a 15 kHz subcarrier spacing (SCS) is assumed. In this case, one slot may have the same concept as one subframe. When the subcarrier spacing is defined as 15 kHz×2n and when 'n' is a positive integer (that is, when the subcarrier spacing is greater than 15 kHz), one subframe may consist of 2n slots. Conversely, when 'n' is a negative integer (that is, when the subcarrier spacing is less than 15 kHz), one slot may consist of 2n subframes. In addition, because the 15 kHz subcarrier spacing is assumed in FIGS. 7A and 7B, one system frame (or radio frame) may be composed of 10 slots. One slot may always consist of 14 OFDM symbols as shown in FIG. 6 regardless of the subcarrier spacing.

As described above, FIG. 7A shows that one time resource for S-SSB transmission is configured. In this case, only one offset value indicating the start point of S-SSB transmission may be configured. Specifically, the start point where the S-SSB is transmitted is shown, as an example, as slot #3 of SFN #1 in FIG. 7A, and this may indicate that transmission of S-SSB starts after an offset of 13 slots from slot #0 of SFN #0. Therefore, a base station may configure an offset value as 13 slots to an S-SSB transmitting UE through system information or RRC signaling. Using the configured offset value, a sidelink UE may transmit the S-SSB in the corresponding slot. Similarly, using a preconfigured offset value, a UE located outside the coverage of the base station may transmit the S-SSB in the corresponding slot. In this case, the S-SSB transmitted in the corresponding slot may have a structure shown in FIG. 7A, 7B, or 8.

The S-SSB initially transmitted in slot #3 of SFN #1 may be repeatedly transmitted in a period of P slots as shown in FIG. 7A. The value of P may be fixed or configured by the base station through system information or RRC signaling (or preconfigured if the sidelink UE is outside the base station coverage). In FIG. 7A, it is assumed that the value of P is 160 ms (160 subframes or 160 slots).

FIG. 7B shows that two time resources for S-SSB transmission are configured. In this case, two offset values indicating the start point of S-SSB transmission may be configured. As described above, if the sidelink UE is located outside the coverage of the base station, two offset values may be preconfigured. The UE, in which two time resources for S-SSB transmission are preconfigured through the two offset values, may transmit the S-SSB in one of the two resources and receive the S-SSB transmitted by another sidelink UE in the other resource, rather than transmit the S-SSB in all the two time resources. This process solves a half-duplexing problem in which transmission and reception of the S-SSB cannot be performed simultaneously.

As in FIG. 7A, it is shown in FIG. 7B that a time resource for the first S-SSB transmission is located in slot #3 of SFN #1 after 13 slots from slot #0 of SFN #0. Thus, the value of offset1 may be 13 slots as in FIG. 7A. It is also shown in FIG. 7B that a time resource for the second S-SSB transmission is located in slot #8 of SFN #1 after 18 slots from slot #0 of SFN #0. Thus, the value of offset2 may be 18 slots. Accordingly, using the configured offset values, the sidelink UE may receive or transmit S-SSB in the corresponding slot.

The S-SSB initially transmitted in slot #3 of SFN #1 may be repeatedly transmitted in a period of P1 slots as shown in FIG. 7B. Also, the S-SSB initially transmitted in slot #8 of SFN #1 may be repeatedly transmitted in a period of P2 slots as shown in FIG. 7B. The values of P1 and P2 may be fixed or preconfigured and may be equal to or different from each other. In FIG. 7B, it is assumed that each of the values of P1 and P2 is 160 ms (160 subframes or 160 slots).

Three offset values may be preconfigured when three time resources for S-SSB transmission are configured. In this case, as when two S-SSB transmission resources are configured, S-SSB transmission may not be performed in all of three S-SSB transmission resources.

Figure 8:
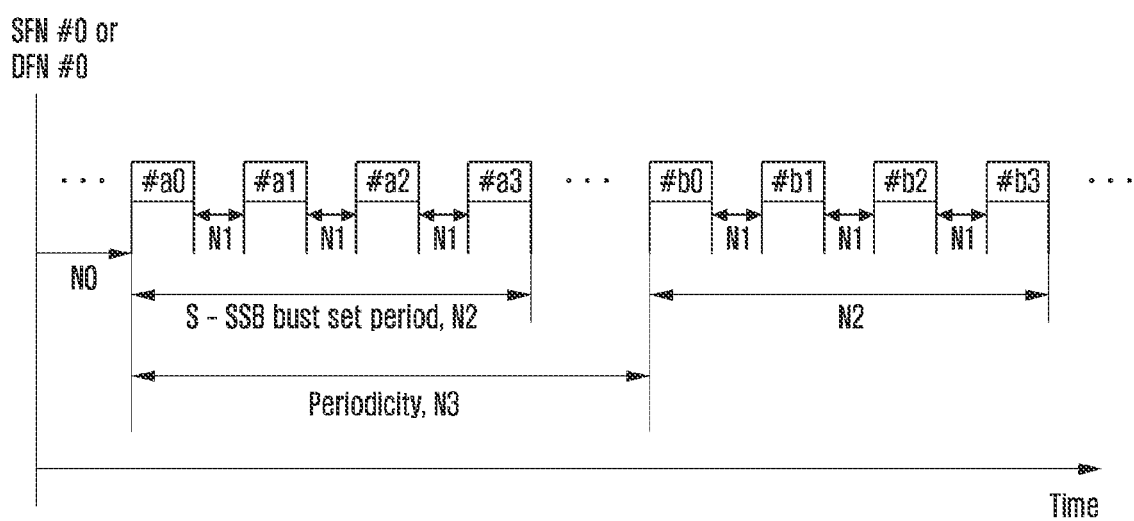
FIG. 8 illustrates a method for transmitting a sidelink synchronization signal according to a third embodiment.

FIG. 8 illustrates a method for transmitting a sidelink synchronization signal according to a third embodiment.

It is shown in FIGS. 7A and 7B that the S-SSB is transmitted once within the S-SSB transmission period. In contrast, there may be cases where the S-SSB is transmitted more than once within the S-SSB transmission period. For example, in transmitting the S-SSB in a hybrid beamforming system, S-SSB transmission may be performed using beam sweeping. That is, different S-SSBs may be transmitted in different beam directions. In another example, when the subcarrier spacing increases, the coverage of the S-SSB may decrease because the power density decreases. In this case, repeatedly transmitting the S-SSB on the time axis can solve the coverage issue. Specifically, assuming that the S-SSB is transmitted through M frequency blocks, the power density may decrease by x times as the subcarrier spacing increases by x times. Therefore, the S-SSB may be repeatedly transmitted x times on the time axis.

For the purposes described above, FIG. 8 shows a case where the S-SSB is transmitted four times within the transmission period of the S-SSB. In FIG. 8, it is shown that the S-SSB is transmitted in a slot separated by N0 slots from SFN #0 or DFN #0 (that is, the offset value is N0). As described above, sidelink synchronization source UEs may start transmission of the S-SSB in a slot separated by N0 slots from SFN #0 or DFN #0. In this case, the S-SSB may be transmitted K times during a certain period, and such transmission may be performed every S-SSB transmission period. Specifically, as shown in FIG. 8, the S-SSB may be transmitted 4 times (K=4) during an N2 period from a slot separated by N0 slots from SFN #0 or DFN #0. Although FIG. 8 shows that N2 is different from N3, N2 and N3 may alternatively have the same value. Although it is assumed in FIG. 8 that K is 4, this is merely an example. At least one of the value of K and the value of N2 may be configured from the base station or may be preconfigured, and may or may not vary depending on a carrier frequency band and/or an SCS used for the transmission of the S-SSB.

The value of N1 refers to an interval between adjacent S-SSBs and may or may not vary depending on a carrier frequency band and/or an SCS used for the transmission of S-SSB. For example, in the frequency band 1 (or frequency range 1 (FR1)) other than the millimeter wave (mmWave) band, the value of N1 may be configured to be large because beam sweeping is not required. In the FR2 including the mmWave band, beam sweeping may be required for coverage expansion, and in this case, the value of N1 may be configured to be small in order to reduce a delay time in the synchronization procedure due to beam sweeping.

In another example, the transmission of the S-SSB may be configured in sidelink synchronization source UEs through a combination of N0, K, N2, and N3. Specifically, for the S-SSB transmission, 15 kHz, 30 kHz, or 60 kHz subcarrier spacing may be used in the FR1. Also, for the S-SSB transmission, a 60 kHz or 120 kHz subcarrier spacing may be used in the FR2. The subcarrier spacing that should be used to transmit the S-SSB in the FR1 and the FR2 may be related to a frequency on which the sidelink is operated or may be configured from the base station through system information and RRC. If there is no base station, such subcarrier spacing may use a preconfigured value or may be configured through PC5-RRC.

In addition to the subcarrier spacing, the number of S-SSB transmissions (K) in each subcarrier spacing may be configured from the base station through system information and RRC. If there is no base station, the number of S-SSB transmissions may use a preconfigured value or may be configured through PC5-RRC. For example, when a 15 kHz subcarrier spacing is used in the FR1, K may be 1. When a 30 kHz subcarrier spacing is used in the FR1, K may be 1 or 2. When K is set to 2, the S-SSB may be repeatedly transmitted twice. When a 60 kHz subcarrier spacing is used in the FR1, K may be 1, 2, or 4. When K is set to 2 or 4, the S-SSB may be repeatedly transmitted twice or four times. When the 60 kHz subcarrier spacing is used in the FR2, K may be set to one of 1, 2, 4, 8, 16, and 32. As in the above-described examples, K greater than 1 may indicate that the S-SSB is repeatedly transmitted corresponding times. When a 120 kHz subcarrier spacing is used in the FR2, K may be set to one of 1, 2, 4, 8, 16, 32, and 64. As in the above-described examples, K greater than 1 may indicate that the S-SSB is repeatedly transmitted corresponding times.

N3 may be always fixed at 160 ms. In addition, the value of N1 may be configured from the base station through system information and RRC. If there is no base station, the value of N1 may use a preconfigured value or may be configured through PC5-RRC.

In FIG. 8, the S-SSB may be transmitted using the same beam or different beams. For example, in FIG. 8, slots #a0, #a1, #a2, #a3, #b0, #b1, #b2, and #b3 are where the S-SSBs are transmitted. In this case, the S-SSBs transmitted in slots #a0, #a1, #a2, and #a3 in FIG. 8 may use different beams, which may be repeatedly transmitted in slots #b0, #b1, #b2, and #b3 (that is, the beam of slot #a0 is transmitted in slot #b0, and the beam of slot #a1 is transmitted in slot #b1). In another example, the S-SSBs transmitted in slots #a0, #a1, #a2, and #a3 in FIG. 8 may use the same beam, and beams different from beams transmitted in slots #a0, #a1, #a2, and #a3 may be used for S-SSB transmission in slots #b0, #b, #b2, and #b3.

Figure 9:
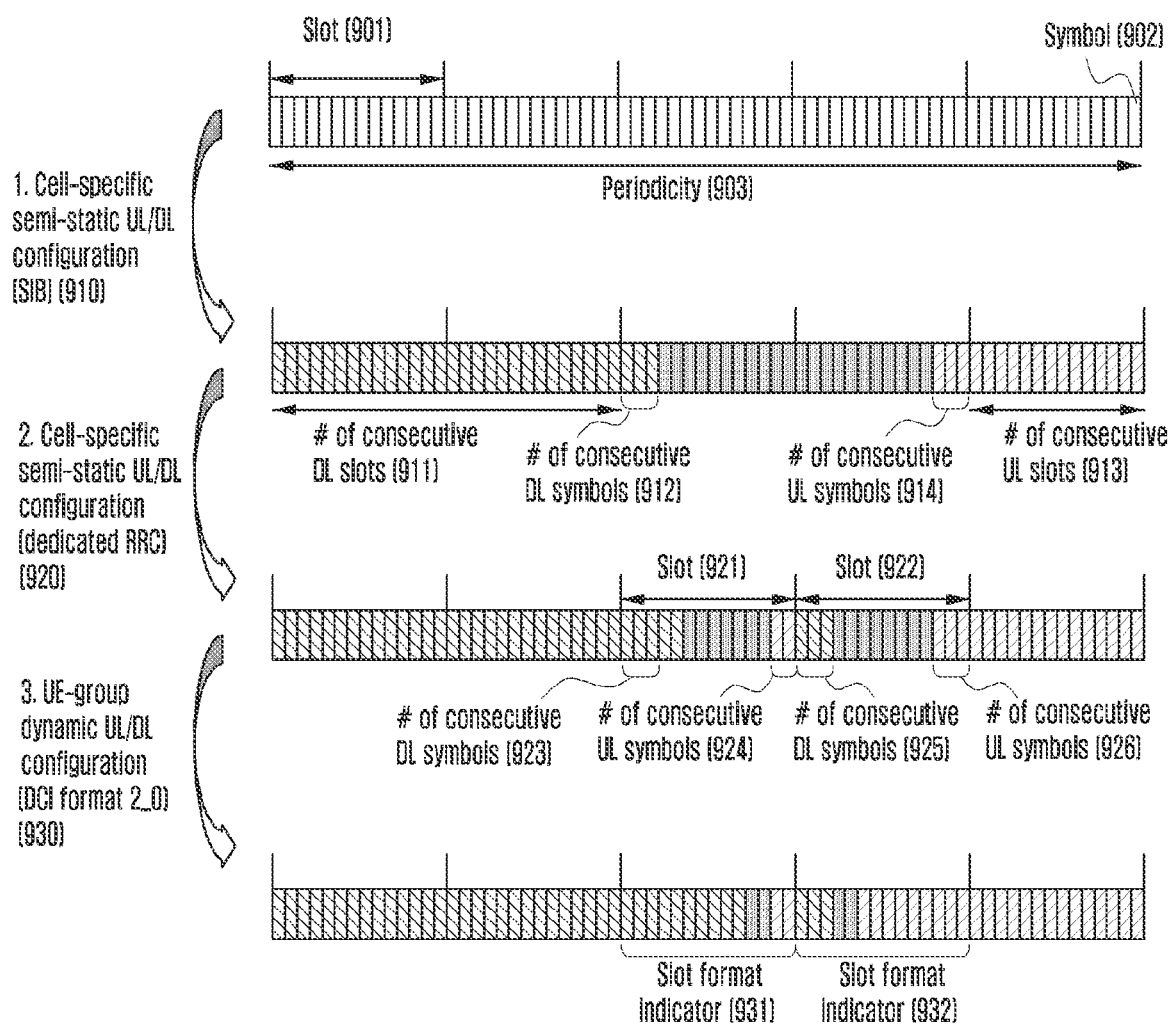
FIG. 9 illustrates uplink-downlink configuration in a base station coverage according to an embodiment.

FIG. 9 illustrates uplink-downlink configuration in a base station coverage according to an embodiment.

In the 5G communication system, the UL/DL configuration of a slot 901 and a symbol 902 may be made in three steps. First, the UL/DL of symbol/slot may be configured semi-statically in a symbol unit based on cell-specific configuration information 910 through system information. Specifically, the cell-specific UL/DL configuration information through system information may contain UL/DL pattern information and reference subcarrier information. Through the UL/DL pattern information, a pattern periodicity 903, the number of consecutive DL slots 911 from a start point of each pattern, the number of symbols 912 of the next slot, the number of consecutive UL slots 913 from the end of the pattern, and the number of symbols 914 of the next slot may be indicated. In this case, the UE may determine, as flexible slots/symbols, slots and symbols which are not indicated with UL and DL.

Second, based on user-specific configuration information 920 through dedicated higher layer signaling, in each of slots 921 and 922 containing the flexible slots or symbols, the number of consecutive DL symbols 923 or 925 may be indicated from the start symbol of the slot and the number of consecutive UL symbols 924 or 926 may be indicated from the end of the slot, or the entire slot may be indicated as DL or UL.

Finally, in order to dynamically change DL/UL signal transmission sections, whether each of symbols indicated as flexible symbols (i.e., symbols not indicated as DL or UL) in each slot is a DL symbol, a UL symbol, or a flexible symbol may be indicated through a slot format indicator (SFI) 931 or 932 contained in a DL control channel.

FIG. 10 illustrates the number of uplink-downlink symbols occupied by 14 symbols constituting one slot according to an embodiment.

When the slot format indicator shown in FIG. 9 indicates one index in format shown in FIG. 10, the format of a specific slot can be selected.

Figure 11:
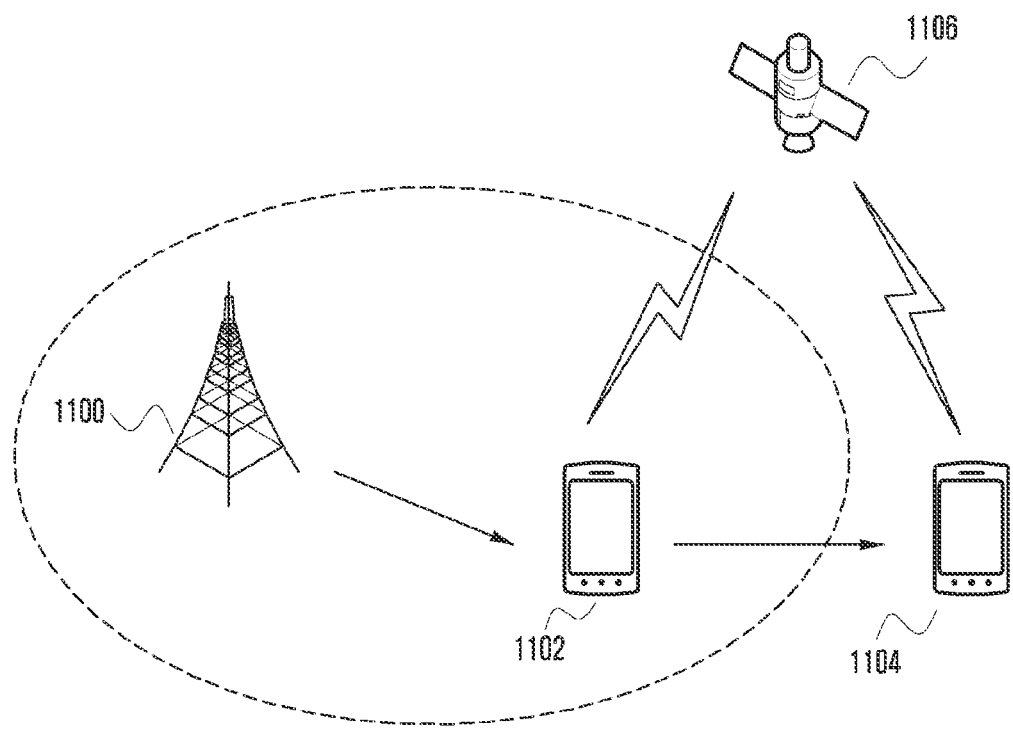
FIG. 11 illustrates when information is transmitted and received between sidelink terminals according to an embodiment.

FIG. 11 illustrates when information is transmitted and received between sidelink terminals according to an embodiment.

In FIG. 11, a sidelink UE 1102 exists in the coverage of communicating with a base station 1100, whereas another sidelink UE 1104 exists outside the coverage of communicating with the base station 1100. As shown in FIG. 11, the sidelink UEs 1102 and 1104 may synchronize with a signal of a GNSS 1106, or the sidelink UE 1104 may synchronize through a synchronization signal transmitted by a certain terminal other than the GNSS 1106. As shown in FIG. 1B, a link between the sidelink UE 1102 and the base station 1100 in FIG. 11 may be a Uu link composed of an uplink and a downlink, and a link between the UEs 1102 and 1104 may be a sidelink. In order to transmit and receive control/data information with other UEs including the UE 1102, the UE 1104 may perform a sidelink synchronization procedure. If the UE 1102 transmits a synchronization signal, the UE 1102 may transmit broadcast information including basic information on a sidelink in addition to the sidelink synchronization signal. The sidelink broadcast information may be transmitted from the UE 1102 to the UE 1104 through the PSBCH.

The sidelink broadcast information may be referred to as other terms such as sidelink MIB (SL-MIB) or sidelink system information. In the sidelink broadcast information, a field indicating a time resource region of S-SSB transmission may exist as described in FIG. 6. This field may be referred to as terms such as TDD-SL-config, TDD-SL-configCommon, or common sidelink resource information. In configuring the S-SSB time resource information, TDD information configured for the Uu communication between the base station 1100 and the UE 1102 (i.e., TDD information configured for cellular communication, not for sidelink communication) should be considered. For example, when the UE 1104 performs sidelink transmission in the downlink reception period of the UE 1102, the downlink reception performance of the UE 1102 may be deteriorated due to interference from the UE 1104. In contrast, when the UE 1104 performs sidelink transmission in the uplink transmission period of the UE 1102 (i.e., the reception period of the base station 1100), a sidelink signal of the UE 1104 received by the base station 1100 may cause interference to an uplink signal of the UE 1102. However, because the UE 1104 is farther away from the base station 1100 than the UE 1102, the quantity of interference caused to the uplink signal of the UE 1102 by the sidelink signal of the UE 1104 at the receiving end of the base station 1100 may be minimal Therefore, performing sidelink transmission/reception at least in a resource region configured as the uplink transmission period of Uu can minimize the amount of interference caused to the cellular link by the sidelink. The TDD configuration information for the sidelink may include at least one of the following contents.

Reference Subcarrier Spacing

Pattern 1 (transmission period, number of downlink slots, number of downlink symbols, number of uplink slots, number of uplink symbols)

Pattern 2 (transmission period, number of downlink slots, number of downlink symbols, number of uplink slots, number of uplink symbols)

Pattern 2 may be omitted according to configuration of the base station or pre-configuration. As shown in FIG. 9, one pattern has one specific transmission period, and downlink, uplink, or flexible symbols in the corresponding transmission period may be determined based on the number of downlink slots, the number of downlink symbols, the number of uplink slots, and the number of uplink symbols. Specifically, the number of downlink slots in the transmission period may refer to the number of slots consisting only of downlink symbols, and the number of downlink symbols may refer to the number of downlink symbols configured from the first symbol within a slot immediately following the number of slots consisting only of downlink symbols. In addition, the number of the uplink slots in the transmission period may refer to the number of slots consisting only of uplink symbols, and the number of uplink symbols may refer to the number of uplink symbols configured from the last symbol within a slot immediately preceding the number of slots consisting only of uplink symbols. In addition, symbols or slots that are not configured as downlink or uplink in the transmission period may be considered as flexible symbols or flexible slots by the UE. In a region corresponding to the flexible symbols and the flexible slots, uplink or downlink control and data information may be transmitted and received through another upper signal or an L1 signal. Information necessary to configure the TDD information of Uu may include reference subcarrier spacing information and information of patterns 1 and 2. The information of patterns 1 and 2 may require information on a transmission period, the number of uplink/downlink slots, and the number of uplink/downlink symbols. In this case, the information on the transmission period may need 3 bits, the information on the number of uplink or downlink slots may need 9 bits, and the information on the number of uplink or downlink symbols may need 4 bits. In Uu, the TDD information may be transmitted and received as SIB information in the form of a physical downlink shared channel (PDSCH).

Common sidelink resource information needs to be configured in consideration of the TDD information configured in the Uu link and may require high transmission reliability due to being transmitted/received through the PSBCH. Therefore, it is necessary to have fewer bits than the number of bits used to configure the TDD information in the Uu link.

The common sidelink resource information may be configured with specific fields by using at least one of the following methods. In addition, it may be sufficiently possible to configure the common sidelink resource information by any combination of the following methods.

Method 11-1: Fields consist of a reference subcarrier spacing of 2 bits, a transmission period of 3 bits, and the number of sidelink slots of 7 bits, that is, a total of 12 bits. The reference subcarrier spacing is used as a reference for configuring sidelink resources, and candidate values may be 15, 30, 60, and 120 kHz. The transmission period refers to a period in which sidelink resource configuration is repeated, and may indicate one of 0.5, 0.625, 1, 1.25, 2, 2.5, 5, and 10 ms. In this case, the 0.625 ms value is valid only when the reference subcarrier spacing is 120 kHz, the 1.25 ms value is valid only when the reference subcarrier spacing is 60 or 120 kHz, and the 2.5 ms value is valid only when the reference subcarrier spacing is 30, 60, or 120 kHz.

Alternatively, available values of the transmission period may vary according to the reference subcarrier spacing. For example, Table 1 below shows values indicated by the transmission period field according to the reference subcarrier spacing.

TABLE 1

| Reference Subcarrier Spacing | Transmission Period (3 bits) (unit: ms) | | | | | | | |
|---|---|---|---|---|---|---|---|---|
| | 000 (bitmap) | 001 | 010 | 011 | 100 | 101 | 110 | 111 |
| 15 kHz | 0.5 | 1 | 2 | 5 | 10 | | | |
| 30 kHz | 0.5 | 1 | 2 | 2.5 | 5 | 10 | | |
| 60 kHz | 0.5 | 1 | 1.25 | 2 | 2.5 | 5 | 10 | |
| 120 kHz | 0.5 | 0.625 | 1 | 1.25 | 2 | 2.5 | 5 | 10 |

In Table 1, the number of sidelink slots refers to the number of slots configured for a sidelink among all slots within the indicated transmission period, and the sidelink slots are sequentially located (in reverse order) from the last slot among all slots within the transmission period. The number of sidelink slots formed of 7 bits may maximally indicate 128 slots. Alternatively, the last 2*n or 3*n (or natural number*n) slots within the transmission period may be indicated for the sidelink. In this case, 'n' is a slot value of the sidelink indicated by the above 7 bits, and the value of a natural number multiplied by 'n' may vary depending on the subcarrier spacing. For example, when the number of sidelink slots is 10 and the total number of slots in the transmission period is 100, the UE determines that the last 10 slots among 100 slots are configured for the sidelink. The UE does not expect that a value indicated by the number of sidelink slots formed of 7 bits is configured to indicate more than the total number of slots determined by the reference subcarrier spacing and the transmission period, and if such as case occurs, the UE considers this as an error. In addition, the number of sidelink slots formed of 7 bits may be configured from the least significant bit (LSB). The method 11-1 is characterized by having only information on the number of slots of one specific link (e.g., sidelink) in addition to the reference subcarrier spacing and the transmission period in order to have a size smaller than the TDD information of Uu as described above.

Method 11-2: While similar to the method 11-1, this is a method of notifying the common sidelink resource information when the base station operates patterns 1 and 2 in the Uu. When notifying the TDD information in the Uu, the base station configures the transmission periods of patterns 1 and 2 to have the same value. Therefore, this transmission period value may be configured as the transmission period of the common sidelink resource information. For example, if each transmission period of patterns 1 and 2 is 10 ms, the transmission period of the common sidelink resource information is also set to 10 ms. This may be regarded as PS=P1=P2, wherein PS is a sidelink transmission period, P1 is a transmission period of pattern 1, and P2 is a transmission period of pattern 2. In addition, the smallest value among the number of uplink slots for each pattern included in the TDD information in the Uu may be used as the value of the number of sidelink slots in the common sidelink resource information. For example, when the number of uplink slots of pattern 1 is 10 and the number of uplink slots of pattern 2 is 5, the number of sidelink slots of common sidelink resource information is set to 5. This may be regarded as NS=min(N1,N2), wherein NS is the number of sidelink slots, N1 is the number of uplink slots of pattern 1, and N2 is the number of uplink slots of pattern 2.

Method 11-3: While similar to method 11-1, information indicated by the 3-bit transmission period in the common sidelink resource information is different in method 11-3. Eight values excluding two of ten values of 0.5, 0.625, 1, 1.25, 2, 2.5, 4, 5, 10, and 20 ms may be configured as the transmission period of 3 bits. For example, values of 0.5, 1, 2, 2.5, 4, 5, 10, and 20 ms excluding values of 0.625 and 1.25 may be indicated as the transmission period information in the common sidelink resource information.

Method 11-4: While similar to method 11-1, in method 11-4, information consists of a reference subcarrier spacing of 2 bits, a transmission period of 4 bits, and the number of sidelink slots of 6 bits, that is, a total of 12 bits. The reference subcarrier spacing is used as a reference for configuring sidelink resources, and candidate values may be 15, 30, 60, and 120 kHz. The transmission period refers to when sidelink resource configuration is repeated, and has one value of 0.5, 0.625, 1, 1.25, 2, 2.5, 4, 5, 10, and 20 ms. In this case, the 0.625 ms value is valid only when the reference subcarrier spacing is 120 kHz, the 1.25 ms value is valid only when the reference subcarrier spacing is 60 or 120 kHz, and the 2.5 ms value is valid only when the reference subcarrier spacing is 30, 60, or 120 kHz.

The number of sidelink slots refers to the number of slots configured for a sidelink among all slots within the indicated transmission period, and the sidelink slots are sequentially located (in reverse order) from the last slot among all slots within the transmission period. The number of sidelink slots formed of 6 bits may maximally indicate 64 slots. Alternatively, the last 2*n or 3*n (or natural number*n) slots within the transmission period may be indicated for the sidelink. In this case, 'n' is a slot value of the sidelink indicated by the above 6 bits, and the value of a natural number multiplied by 'n' may vary depending on the subcarrier spacing. For example, in a reference subcarrier spacing of 120 kHz, the last 2n slots within the transmission period may be indicated for the sidelink, in which case a maximum of 128 slots may be indicated as the number of sidelink slots. The UE does not expect that a value indicated by the number of sidelink slots formed of 6 bits is configured to indicate more than the total number of slots determined by the reference subcarrier spacing and the transmission period. If such a case occurs, the UE considers this as an error. In addition, the number of sidelink slots formed of 6 bits may be configured from the LSB.

Method 11-5: While similar to method 11-1 in that the common sidelink resource information contains fields such as the reference subcarrier spacing, the transmission period, and the number of sidelink slots, in method 11-5, the transmission period and the number of sidelink slots may vary in the number of bits depending on the reference subcarrier spacing of 2 bits. For example, in the reference subcarrier spacing of 15 kHz or 30 kHz, the transmission period and the number of sidelink slots may be formed of 3 bits and 7 bits, respectively, and in the reference subcarrier spacing of 60 kHz or 120 kHz, the transmission period and the number of sidelink slots may be formed of 4 bits and 6 bits, respectively. In addition, even if the transmission period has the same bit, the value of the transmission period indicated for each reference subcarrier spacing may be different. For example, Table 2 below shows values indicated by the transmission period field according to the reference subcarrier spacing.

TABLE 2

| Reference Subcarrier Spacing | Transmission Period (unit: ms) | | | | | | | | |
|---|---|---|---|---|---|---|---|---|---|
| 15 kHz (3 bits) | 0.5 | 1 | 2 | 4 | 5 | 10 | 20 | | |
| 30 kHz (3 bits) | 0.5 | 1 | 2 | 2.5 | 4 | 5 | 10 | 20 | |
| 60 kHz (4 bits) | 0.5 | 1 | 1.25 | 2 | 2.5 | 4 | 5 | 10 | 20 |
| 120 kHz (4bits) | 0.5 | 0.625 | 1 | 1.25 | 2 | 2.5 | 4 | 5 | 10 | 20 |

In Table 2, if the reference subcarrier spacing is 15 kHz or 30 kHz, the value indicated by the transmission period of 3 bits may be 0.5, 1, 2, 2.5, 4, 5, 10, and 20, in which 2.5 may be considered as a valid indication only for 30 kHz. In addition, if the reference subcarrier spacing is 60 kHz or 120 kHz, the value indicated by the transmission period of 4 bits may be 0.5, 0.625, 1, 1.25, 2, 2.5, 4, 5, 10, and 20, in which 0.625 may be considered as a valid instruction only for 120 kHz. The number of sidelink slots (x*n) indicates that the last x*n slots among slots in the transmission period are to be configured for the sidelink. In this case, 'x' is a natural number and may have different values for each subcarrier spacing or have the same value regardless of the subcarrier spacing, and 'n' is a value indicated by the field of the number of sidelink slots in the common sidelink resource information.

Method 11-6: While similar to method 11-1 or 11-5 in that the common sidelink resource information contains fields such as the reference subcarrier spacing, the transmission period, and the number of sidelink slots, in method 11-6, the number of sidelink slots may vary in the number of bits depending on the reference subcarrier spacing of 2 bits while the transmission period maintains 4 bits. For example, in the reference subcarrier spacing of 15 kHz or 30 kHz, the number of sidelink slots formed of 6 bits and reserved bit information formed of 2 bits may be used, and in the reference subcarrier spacing of 60 kHz or 120 kHz, the number of sidelink slots of 7 bits and reserved bit information formed of 1 bit may be used. The reserved bit is not a field contained in the common sidelink resource information. However, the reserved bit may be configured as one of information fields in the PSBCH through which the common sidelink resource information is transmitted and received and may be used for future services.

Method 11-7: This is a generalized method of the above-described methods 11-1 to 11-6. The common sidelink information has a k-bit value and is configured with fields including a reference subcarrier spacing of x bits, a transmission period of y bits, and the number of sidelink slots of z bits (i.e., k=x+y+z). At least one of the 'y' and 'z' may have different values depending on the reference subcarrier spacing value. The value of 'y' is determined in consideration of the number of transmission periods ($T_i$) available in a specific subcarrier spacing (i) and may be determined through $y_i$=ceiling($\log_2(T_i)$).

The 'y' included in the common sidelink information may have different bit values for each reference subcarrier spacing or may use the maximum value (i.e., max($y_1, y_2, \ldots, y_i$)) among $y_i$ values calculated through some or all subcarrier spacing values. The value of 'z' is determined in consideration of the maximum number of sidelink slots ($N_i$) available in a specific subcarrier spacing (i) and may be determined through $z_i$=ceiling($\log_2(N_i)$).

The 'z' included in the common sidelink information may have different bit values for each reference subcarrier spacing or may use the maximum value (i.e., max($z_1, z_2, \ldots, z_i$)) among $z_i$ values calculated through some or all subcarrier spacing values. The number of sidelink slots ($N_i$) indicated through the z-bit value may be represented as $N_i$=m*b, where 'm' is a natural number which may or may not vary according to the subcarrier spacing, and 'b' is the value indicated through z bits. The number of sidelink slots refers to the number of last slots configured for the sidelink among slots within the transmission period.

Method 11-8: This is similar to the above-described methods in that the common sidelink information has a k-bit value and is configured with fields including a reference subcarrier spacing of x bits, a transmission period of y bits, and the number of sidelink slots of z bits, but the z bits in method 11-8 are composed of za bits and zb bits (i.e., z=za+zb). The value of 'za' indicates granularity information of slots used for the sidelink, and the value of 'zb' indicates the number of sidelink slots. In other words, the number of sidelink slots ($N_i$) is determined as $N_i$=m*b, where the values of 'm' and 'b' may be determined by za bits and zb bits, respectively.

For example, when the reference subcarrier spacing is 120 kHz and the transmission period is 20 ms, a total of 160 slots may exist within the indicated transmission period, and when sidelink slots are indicated in unit of one slot, a total of 8 bits may be required. However, if less than 8 bits is required due to the constraints on the information size of the PSBCH, and if the sidelink can be indicated in units of 4 slots, a total of 6 bits may be required because it is only necessary to indicate a total of 40 slots. The bit sizes of 'za' and 'zb' may or may not vary for each subcarrier spacing, and a range of information indicated by each bit may or may not vary for each subcarrier spacing. Alternatively, unlike method 11-8, a method of using one field to notify information about the transmission period and the number of sidelink slots may be sufficiently considered. That is, in this method, one value of a specific field may indicate the transmission period and the number of last slots used for the sidelink communication within the transmission period.

Figure 12:
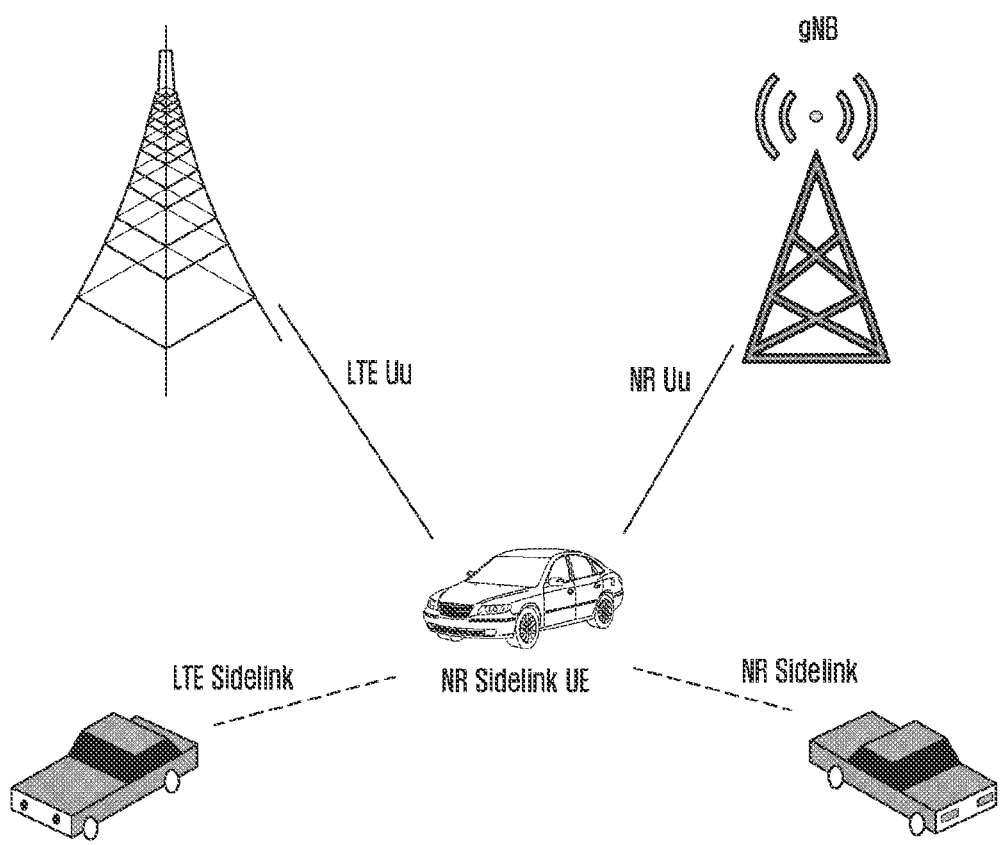
FIG. 12 illustrates types of links through which a sidelink terminal can perform sidelink communication according to an embodiment.

FIG. 12 illustrates types of links through which a sidelink terminal can perform sidelink communication according to an embodiment.

Specifically, sidelink communication may be performed through at least one of the following links.

A link between an NR sidelink UE and another NR sidelink UE may be referred to as an NR sidelink. The NR sidelink UE may transmit sidelink control information and data information for NR sidelink communication to another NR sidelink UE through the NR sidelink. In addition, the NR sidelink UE may receive sidelink control information and data information for NR sidelink communication from another NR sidelink UE through the NR sidelink.

A link between an NR sidelink UE and an LTE sidelink UE may be referred to as an LTE sidelink. In this case, it may be assumed that the NR sidelink UE has the ability to support LTE sidelink communication. The NR sidelink UE may transmit and receive control information and data information for LTE sidelink communication through the LTE sidelink.

A downlink or uplink between an NR sidelink UE and an NR base station may be referred to as an NR Uu.
  The NR sidelink UE may receive control information and data information on NR sidelink transmission and reception from the gNB through the NR Uu. In addition, the NR sidelink UE may transmit NR sidelink control information and data information, received from another NR sidelink UE, to the gNB through the NR Uu.
  The NR sidelink UE may receive control information and data information on LTE sidelink transmission and reception from the gNB through the NR Uu. In addition, the NR sidelink UE may transmit LTE sidelink control information and data information, received from an LTE sidelink terminal, to the gNB through the NR Uu. In this case, it may be assumed that the NR sidelink UE has the ability to support LTE sidelink communication.

A downlink or uplink between an NR sidelink UE and an LTE base station (eNB) may be referred to as an LTE Uu.
  The NR sidelink UE may receive control information and data information on NR sidelink transmission and reception from the eNB through the LTE Uu. In addition, the NR sidelink UE may transmit NR sidelink control information and data information, received from another NR sidelink UE, to the eNB through the LTE Uu. In this case, it may be assumed that the NR sidelink UE has the ability to support the LTE Uu.

The NR sidelink UE may receive control information and data information on LTE sidelink transmission and reception from the eNB through the LTE Uu. In addition, the NR sidelink UE may transmit LTE sidelink control information and data information, received from an LTE sidelink terminal, to the eNB through the LTE Uu. In this case, it may be assumed that the NR sidelink UE has the ability to support LTE sidelink communication and also has the ability to support the LTE Uu.

Figure 13:
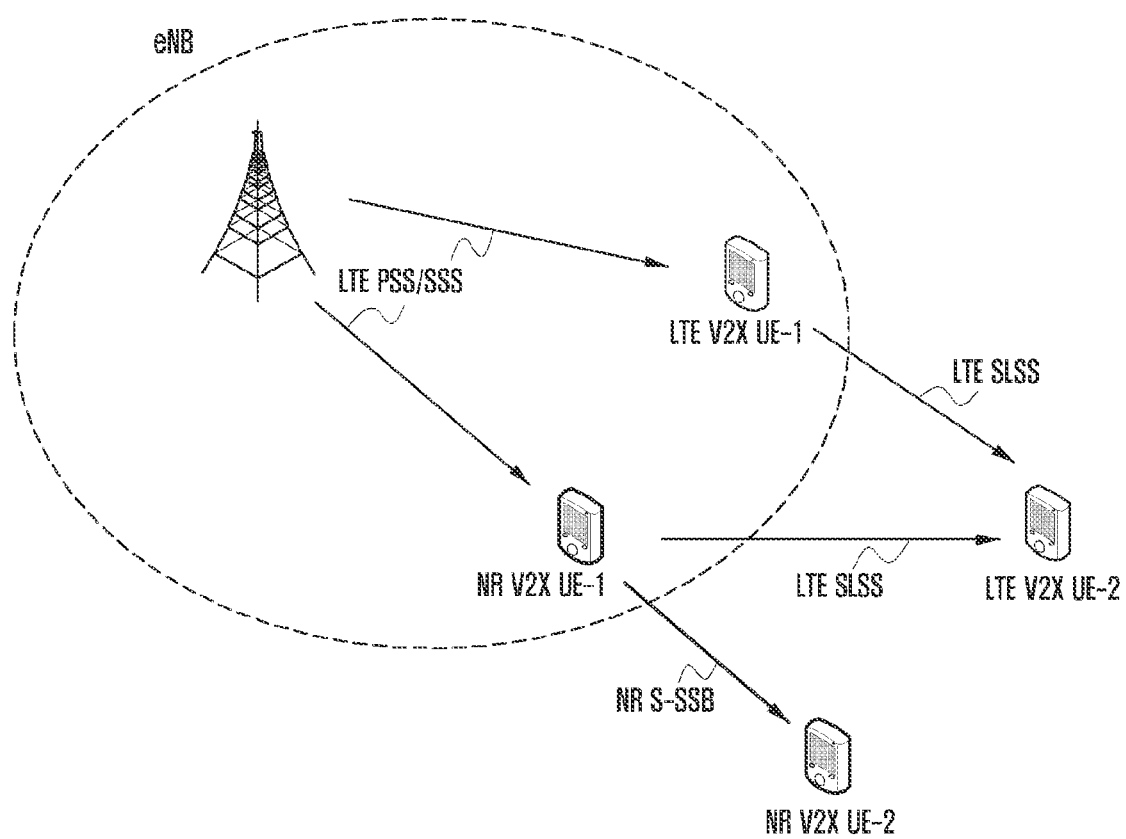
FIG. 13 illustrates a sidelink synchronization procedure according to a first embodiment.

FIG. 13 illustrates a sidelink synchronization procedure according to a first embodiment.

In FIG. 13, an NR V2X UE-1 and an LTE V2X UE-1 exist within the coverage of the eNB, and an NR V2X UE-2 and an LTE V2X UE-2 exist outside the coverage of the eNB. The NR V2X UE-1 and the LTE V2X UE-1 existing within the eNB coverage are capable of detecting and receiving LTE PSS/SSS transmitted by the eNB, but the NR V2X UE-2 and the LTE V2X UE-2 existing outside the eNB coverage are incapable of detecting and receiving LTE PSS/SSS transmitted by the eNB. In FIG. 13, it may be assumed that the NR V2X UE-1 within the eNB coverage has selected the eNB as the synchronization source in accordance with the rule described in FIG. 4. Although FIG. 13 shows that the NR V2X UE-1 is capable of transmitting both NR S-SSB and LTE SLSS, this is merely an example. That is, the NR V2X UE-1 may have the ability to transmit only NR S-SSB without the transmission capability of LTE SLSS.

Because the NR V2X UE-1 within the eNB coverage has selected the eNB as the synchronization source, this may indicate that NR V2X UEs have the ability to detect LTE PSS/SSS which is a synchronization signal of the eNB (Alt1). In further examples, the NR V2X UE-1 selection of the eNB as the synchronization source may indicate that the NR V2X UE-1 is able to detect LTE PSS/SSS transmitted by the eNB and decode LTE PBCH (Alt2), detect LTE PSS/SSS transmitted by the eNB, decode LTE PBCH, and also decode LTE V2X SIB information configured for LTE V2X UEs (Alt3), or detect LTE PSS/SSS transmitted by the eNB, decode LTE PBCH, and decode NR V2X SIB information configured for NR V2X UEs within the eNB coverage (Alt4). Alternatively, the UE may be capable of both Alt3 and Alt4.

Under these various assumptions, an NR V2X UE within the eNB coverage may transmit an NR S-SSB for a sidelink UE located outside the eNB coverage. In this case, the above-described information in FIGS. 6 to 11 may be contained in PSBCH used for constructing the NR S-SSB. Specifically, at least one of the frame number, the downlink and uplink configuration information, the slot index, and the coverage indicator described in FIG. 6 may be contained. In addition, the downlink and uplink configuration information may be configured through one of the methods described in FIG. 11.

In FIG. 13, the NR V2X UE-1 may configure the coverage indicator field of the PSBCH to '1' because it is located within the eNB coverage. In another example, because the NR V2X UE-1 is in the eNB coverage, but transmits the NR S-SSB, the NR V2X UE-1 may be considered to be located outside the coverage of a base station from the viewpoint of the NR sidelink. Therefore, in this case, the NR V2X UE-1 may configure the coverage indicator field of the PSBCH to '0'. Specifically, if the Uu of the eNB and the NR sidelink for the NR V2X UE-1 have the same frequency, the NR V2X UE-1 is considered to be within the base station coverage, and the coverage indicator field of the PSBCH may be set to '1'. In contrast, if the Uu of the eNB and the NR sidelink for the NR V2X UE-1 have different frequencies, the NR V2X UE-1 is considered to be outside the base station coverage, and the coverage indicator field of the PSBCH may be set to '0'.

In FIG. 13, the NR S-SSB transmitted by the NR V2X UE-1 within the eNB coverage is for performing a sidelink synchronization operation of an NR sidelink UE located outside the eNB coverage. As described in FIG. 4, the NR sidelink UE may select each of an NR base station (gNB) and an LTE base station (eNB) as the sidelink synchronization source. Because the NR V2X UE-1 is within the gNB coverage, it may transmit the uplink-downlink configuration information through the PSBCH as described in FIG. 6 in order to minimize interference caused by sidelink UEs located outside the gNB coverage to cellular UEs or sidelink UEs located within the gNB coverage. However, when the carrier frequency at which the Uu operates and the frequency at which the NR sidelink operates are different from each other, it may not be necessary to consider the above interference issue. In this case, the uplink-downlink configuration information contained in the PSBCH is unnecessary and may be omitted, set to be unused (i.e., none), or set to a specific value (e.g., all bits indicating the uplink-downlink configuration information are set to '0' or set to '1'). In contrast, when the carrier frequency at which the Uu operates and the frequency at which the NR sidelink operates are equal to each other, it is necessary to consider the interference issue.

In this case, as described in FIG. 6, the uplink-downlink configuration information formed of 12 or 13 bits may be contained in the PSBCH.

Figure 14:
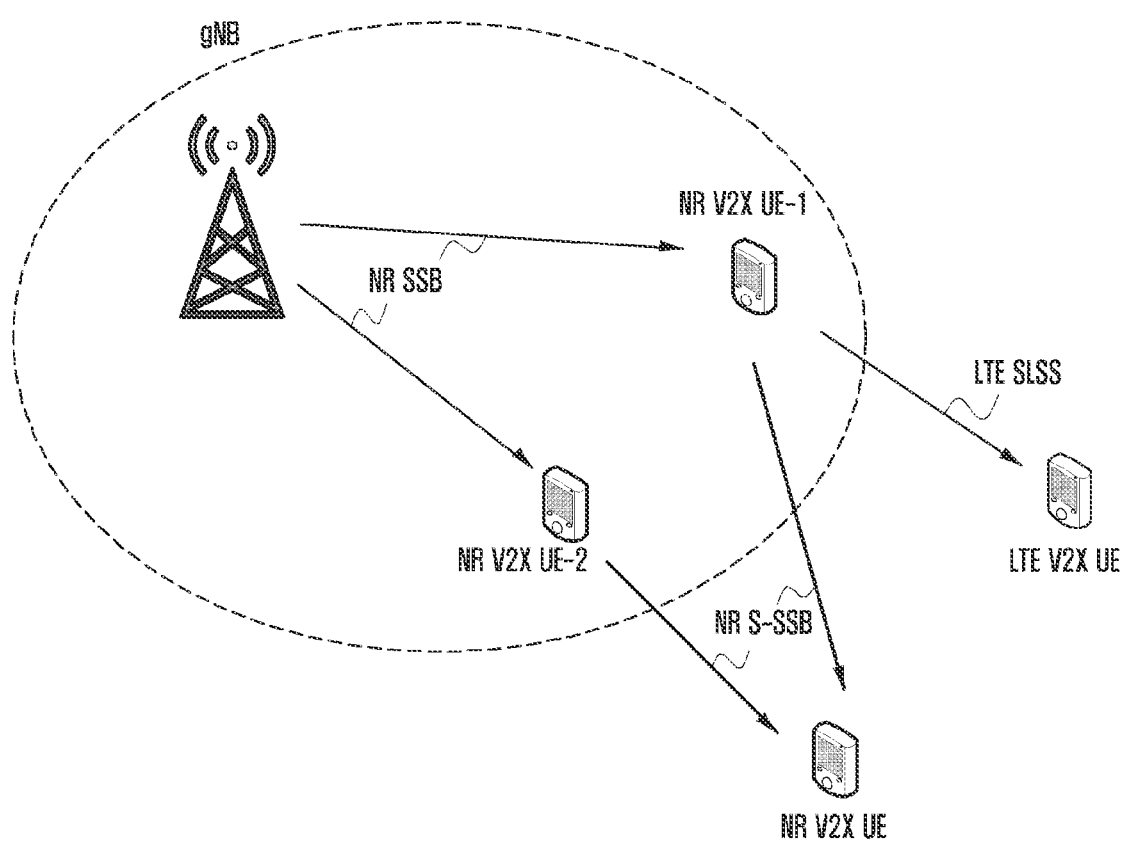
FIG. 14 illustrates a sidelink synchronization procedure according to a second embodiment.

FIG. 14 illustrates a sidelink synchronization procedure according to a second embodiment.

In FIG. 14, an NR V2X UE-1 and an NR V2X UE-2 exist within the coverage of the gNB, and an NR V2X UE and an LTE V2X UE exist outside the gNB coverage. The NR V2X UE-1 and the NR V2X UE-2 existing within the gNB coverage are capable of detecting and receiving NR SSB transmitted by the gNB, but the NR V2X UE and the LTE V2X UE existing outside the gNB coverage are incapable of detecting and receiving NR SSB transmitted by the gNB. In addition, the LTE V2X UE is incapable of detecting and receiving NR SSB even when it exists in the gNB coverage. In FIG. 14, it may be assumed that the NR V2X UE-1 and the NR V2X UE-2 within the gNB coverage have selected the gNB as the synchronization source in accordance with the rule mentioned in FIG. 4. Although FIG. 14 shows that the NR V2X UE-1 is capable of transmitting both NR S-SSB and LTE SLSS, this is merely an example. That is, the NR V2X UE-1 may have the ability to transmit only NR S-SSB without the transmission capability of LTE SLSS.

In FIG. 13, it is shown that the NR sidelink UE exists in the eNB coverage and desires to transmit NR S-SSB within the gNB coverage. In contrast, FIG. 14 shows a case in which the NR sidelink UE exists in the gNB coverage and desires to transmit LTE SLSS within the gNB coverage. The subcarrier spacing used for LTE SLSS transmission is always fixed at 15 kHz, which may be different from the subcarrier spacing used for NR S-SSB transmission. Therefore, when the NR V2X UE-1 transmits LTE SLSS within the gNB coverage, and when the NR Uu and the LTE sidelink operate at the same carrier frequency, this may cause interference to UEs performing NR sidelink communication and UEs performing NR cellular communication within the gNB coverage. In contrast, if the NR Uu and the LTE sidelink operate at different carrier frequencies, the above interference issue may not need to be considered.

Under these various assumptions, an NR sidelink UE (supporting the LTE sidelink) within the gNB coverage may transmit an LTE SLSS for an LTE sidelink UE located outside the gNB coverage. In this case, the above-described information in FIG. 6 may be contained in PSBCH used for constructing the LTE SLSS. Specifically, at least one of the frame number, the downlink and uplink configuration information, the slot index, and the coverage indicator described in FIG. 6 may be contained. In this case, because the LTE SLSS uses only a 15 kHz subcarrier spacing, the slot index may have the same meaning as the subframe index as described in FIG. 6.

In FIG. 14, the NR V2X UE-1 may configure the coverage indicator field of the PSBCH to '1' because it is located within the gNB coverage. In another example, because the NR V2X UE-1 is in the gNB coverage, but transmits the LTE SLSS, the NR V2X UE-1 may be considered to be located outside the coverage of a base station from the viewpoint of the LTE sidelink. Therefore, the NR V2X UE-1 may configure the coverage indicator field of the PSBCH to '0'. Specifically, if the Uu of the gNB and the LTE sidelink for the NR V2X UE-1 have the same frequency, the NR V2X UE-1 is considered to be within the base station coverage, and the coverage indicator field of the PSBCH may be set to '1'. In contrast, if the Uu of the gNB and the LTE sidelink for the NR V2X UE-1 have different frequencies, the NR V2X UE-1 is considered to be outside the base station coverage, and the coverage indicator field of the PSBCH may be set to '0'.

In FIG. 13, the NR S-SSB transmitted by the NR V2X UE-1 within the eNB coverage is for performing a sidelink synchronization operation of an NR sidelink UE located outside the eNB coverage. As described in FIG. 4, the NR sidelink UE may select each of an NR base station (gNB) and an LTE base station (eNB) as the sidelink synchronization source. However, in FIG. 14, the LTE SLSS transmitted by the NR V2X UE-1 within the gNB coverage is for performing a sidelink synchronization operation of an LTE sidelink UE located outside the gNB coverage. Because the LTE sidelink UE cannot select the gNB as the sidelink synchronization source, the NR V2X UE-1 can always set the coverage indicator of the PSBCH to '0' in FIG. 14 regardless of whether the carrier frequency where the Uu operates is equal to or different from the carrier frequency where the LTE sidelink operates.

Because the NR V2X UE-1 is within the gNB coverage, it may transmit the uplink-downlink configuration information through the PSBCH as described in FIG. 6 in order to minimize interference caused by sidelink UEs located outside the gNB coverage to cellular UEs or sidelink UEs located within the gNB coverage. However, when the carrier frequency at which the NR Uu operates and the frequency at which the LTE sidelink operates are different from each other, it may not be necessary to consider the above interference issue. In this case, the uplink-downlink configuration information contained in the PSBCH is unnecessary and may be omitted, set to be unused (i.e., none), or set to a specific value (e.g., all bits indicating the uplink-downlink configuration information are set to '0' or set to '1'). In contrast, when the carrier frequency at which the NR Uu operates and the frequency at which the LTE sidelink operates are equal to each other, it is necessary to consider the interference issue.

The LTE sidelink operates in an intelligent transport system (ITS) dedicated frequency band, which may be different from the frequency band of the NR Uu. In addition, the PSBCH transmitted by the NR V2X UE-1 located within the gNB coverage is for supporting the synchronization procedure of the LTE sidelink UE. Because the LTE sidelink UE does not consider the gNB as the sidelink synchronization source as described above, in FIG. 14 the NR V2X UE-1 may set the coverage indicator to '0' even though it is located in the base station coverage, and the uplink-downlink configuration information formed of 3 bits may be contained in the PSBCH as in the PSBCH of a conventional LTE sidelink. In this case, the uplink-downlink configuration information contained in the PSBCH transmitted by the NR V2X UE-1 may be set to 'none'.

Figure 15:
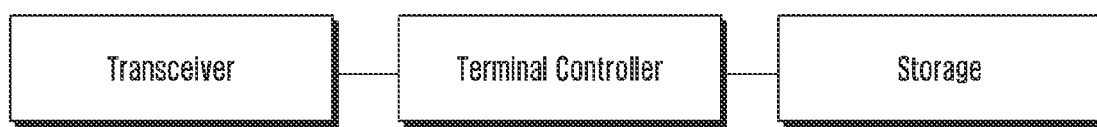
FIG. 15 illustrates a structure of a terminal according to an embodiment.

FIG. 15 illustrates a structure of a terminal according to an embodiment.

Referring to FIG. 15, the terminal (UE) may include a transceiver, a terminal controller, and a storage. In the disclosure, the terminal controller may be defined as a circuit, an application-specific integrated circuit, or at least one processor.

The transceiver may transmit and receive signals to and from other network entities. For example, the transceiver may receive system information from a base station and may receive a synchronization signal or a reference signal.

The terminal controller may control the overall operation of the terminal according to an embodiment. For example, the terminal controller may control a signal flow of operations described in the disclosure and illustrated in the drawings. Specifically, the terminal controller operates according to a control signal received from the base station and may exchange messages or signals with other terminals and/or base stations through the transceiver.

The storage may store at least one of information transmitted and received through the transceiver and information generated through the terminal controller.

Figure 16:
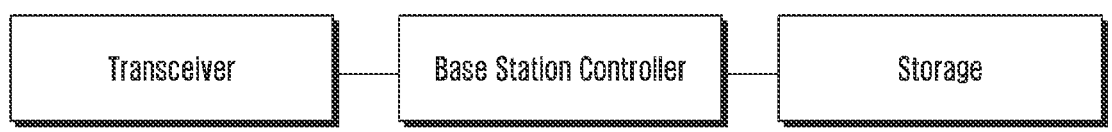
FIG. 16 illustrates a structure of a base station according to an embodiment.

FIG. 16 illustrates a structure of a base station according to an embodiment.

Referring to FIG. 16, the base station (eNB or gNB) may include a transceiver, a base station controller, and a storage. In the disclosure, the base station controller may be defined as a circuit, an application-specific integrated circuit, or at least one processor.

The transceiver may transmit and receive signals to and from other network entities. For example, the transceiver may transmit system information to a terminal and may transmit a synchronization signal or a reference signal.

The base station controller may control the overall operation of the base station according to an embodiment. For example, the base station controller may control operations described in the disclosure in order to manage and reduce interference with an adjacent base station. Specifically, the base station controller transmits a control signal to the terminal through the transceiver so as to control the operations of the terminal and may exchange messages or signals with the terminal through the transceiver.

The storage may store at least one of information transmitted and received through the transceiver and information generated through the base station controller.

Figure 17:
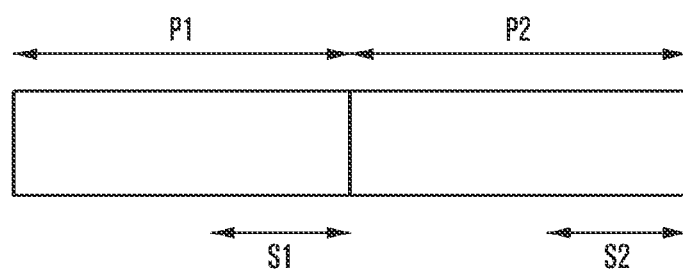
FIG. 17 illustrates sidelink resource information received by a sidelink terminal according to an embodiment.

FIG. 17 illustrates sidelink resource information received by a sidelink terminal according to an embodiment.

Referring to FIG. 17 together with FIG. 11, the sidelink UE 1104 receives sidelink resource information from the sidelink UE 1102 through the PSBCH. Specifically, the sidelink resource information may include TDD configuration information used for uplink and downlink communication within the coverage of the base station 1100. The TDD configuration information may indicate at least one or any combination of the following fields.

1. A field indicating a transmission period: This field indicates a period of a resource (e.g., an uplink slot) for uplink transmission of UEs located in the coverage of the base station 1100 operating in TDD. This field may include all values of 0.5, 0.625, 1, 1.25, 2, 2.5, 4, 5, 10, and 20 ms, or include at least some values. In addition to the above values, integer values capable of dividing 20 ms without remainder may be included, and the minimum value of such integer values may be 0.5 ms. In addition, a value indicating the above transmission period may vary according to the subcarrier spacing. For example, when the transmission period is configured based on the subcarrier spacing of 15 kHz, a transmitting UE is allowed to sufficiently inform, using 3 bits, which value of 0.5, 1, 2, 4, 5, 10, and 20 ms is configured as the transmission period. The 15 kHz subcarrier spacing may be always applied as a fixed value regardless of the subcarrier spacing of the S-SSB. In addition, the 15 kHz is an example, and any other subcarrier spacing may be always applied as a fixed value. In addition, FR1 and FR2 may have different fixed subcarrier spacing values. The transmission period may be regarded as a value of 'T'.
2. A field indicating a transmission period pattern: This field may or may not be present in the PSBCH according to the subcarrier spacing. When this field is present in the PSBCH, it may have 1 bit information. This is a value indicating whether a transmission period value configured in the transmission period field has one transmission period or a combination of two transmission periods having equal lengths.

For example, when the transmission period value indicates 10 ms in the transmission period field, the transmission period pattern field of 1 bit may indicate whether the transmission period value indicates one transmission period of 10 ms or the sum of two 5 ms transmission periods. Alternatively, it may be possible to indicate whether the transmission period value configured in the transmission period field indicates one transmission period or one of two consecutive transmission periods. For example, when the transmission period value indicates 10 ms in the transmission period field, the transmission period pattern field of 1 bit may indicate whether the transmission period value indicates one transmission period of 10 ms or another transmission period of 20 ms formed of two units of 10 ms. In summary, the transmission period pattern field may be used to indicate whether the transmission period value represents one transmission period or a combination of two transmission periods. If the transmission period value indicated in the transmission period field is T, the former case refers to T=T1+T2, where T1=T2, and the latter case refers to T+T=T0.

3. A field indicating the number of sidelink slots: This field indicates information on the number of slots for sidelink communication within a transmission period configured by the transmission period field and the transmission period pattern field. Specifically, this field indicates the number of sidelink slots (in reverse order) from the last slot among all slots included in the transmission period indicated by the transmission period field and the transmission period pattern field.

For example, if a total of 100 slots are determined by the transmission period field and the transmission period pattern field, and if 10 slots are determined for the sidelink by the number of sidelink slots field, the UE determines that the last 10 slots among 100 slots are used for sidelink communication. In addition, a method of interpreting the number of sidelink slots field may vary according to the transmission period pattern. For example, if the transmission period pattern field indicates a combination of two transmission periods, the field indicating the number of sidelink slots may be used for indicating, at a portion thereof, the number of slots for sidelink communication among all slots included in the first transmission period, and also for indicating, at the other portion thereof, the number of slots for sidelink communication among all slots included in the second transmission period. In summary, depending on whether there is one or two transmission periods determined by the transmission period and the transmission period pattern, the method of interpreting the field indicating the number of sidelink slots may vary. The size of this field may be 8 bits or any other number of bits.

When information indicating sidelink resources in the above-described PSBCH is 12 bits, it is possible for the information indicating sidelink resources to be composed of a field of 3 bits indicating a transmission period, a field of 1 bit indicating a transmission period pattern, and a field of 8 bits indicating the number of sidelink slots. In addition, the information indicating sidelink resources assumes a reference subcarrier spacing based on 15 kHz. Transmission period values that can be indicated by the 3-bit transmission period field may be all or some of 0.5, 1, 2, 4, 5, 10, and 20 ms. The 1-bit transmission period pattern field indicates whether the transmission period value represents one transmission period or a combination of two transmission periods. That is, the transmission period pattern indicates whether only one transmission period exists or two transmission periods exist. When only one transmission period is indicated, the entire 8-bit field indicating the number of sidelink slots indicates information on the number of slots used for sidelink within the transmission period. Alternatively, when the maximum transmission period is 20 ms in 15 kHz, there are only 20 slots, and it is therefore possible to indicate the number of sidelink slots by using only 5 bits of the LSB and allow the remaining MSB bits to have a fixed value of 0 or 1.

When there are two transmission periods, the 8-bit field indicating the number of sidelink slots is divided into two fields. That is, 4 bits of MBS indicate the number of sidelink slots among all slots in the first transmission period, and 4 bits of LSB indicate the number of sidelink slots among all slots in the second transmission period. For example, when it is indicated that the transmission period is 20 ms and the transmission period pattern has two transmission periods, each of the first and second transmission periods may have a length of 10 ms. That is, the sum of the first transmission period and the second transmission period becomes the value indicated by the transmission period field.

Alternatively, when it is indicated that the transmission period is 10 ms and the transmission period pattern has two transmission periods, each of the first and second transmission periods may have a length of 10 ms equal to the value indicated by the transmission period field. According to the above methods, among 8 bits for the field indicating the number of sidelink slots, first 4 bits are used to indicate the number of sidelink slots in the first transmission period of 10 ms, and second 4 bits are used to indicate the number of sidelink slots in the second transmission period of 10 ms.

Therefore, the UE may receive information indicating different numbers of sidelink slots with respect to the first and second transmission periods.

One slot in the 15 kHz subcarrier spacing will have the same length of time as 2 slots in the 30 kHz subcarrier spacing, 4 slots in the 60 kHz subcarrier spacing, and 8 slots in the 120 kHz subcarrier spacing. Therefore, when synchronizing the SSB at a subcarrier spacing other than 15 kHz and then performing communication at that subcarrier spacing for sidelink communication, the UE reinterprets sidelink resource information, indicated based on the 15 kHz subcarrier spacing, as sidelink resource information at the subcarrier spacing used in synchronization and then performs sidelink communication. In other words, when one specific slot is configured for a sidelink resource through sidelink resource information indicated based on the 15 kHz subcarrier spacing, the UE determines a slot, in which at least one symbol (or all symbols in the slot) partially overlaps with the specific slot in terms of time resources, as a resource region configured for sidelink communication. Although it is assumed that the reference subcarrier spacing of information indicating the sidelink resource is 15 kHz, any other subcarrier spacing value may be used. FR1 and FR2 may have the same or different reference subcarrier spacing values.

The field indicating the transmission period and the field indicating the transmission period pattern may be formed of separate and different bit fields. Alternatively, in one bit field, one bit value may simultaneously indicate the transmission period and the transmission period pattern.

In FIG. 17, two transmission periods P1 and P2 are determined by the field indicating the transmission period and the field indicating the transmission period pattern. The sum of P1 and P2 should be a value that divides 20 ms without pause. Alternatively, in FIG. 17, the value of only one transmission period P1 or P2 among two transmission periods P1 and P2 may be determined by the field indicating the transmission period and the field indicating the transmission period pattern. For example, Table 3 below shows information regarding the index, P1 and P2.

TABLE 3

| Index | P1 | P2 |
|---|---|---|
| 1 | 0.5 ms | 0.5 ms |
| 2 | 1 ms | 1 ms |
| 3 | 0.5 ms | 2 ms |
| 4 | . . . | . . . |

Referring to Table 3, the transmission period field indicates transmission periods P1 and P2, and the transmission period pattern field indicates whether only the P1 value is actually used or the P1 and P2 values are used together.

Alternatively, as shown in Table 4 below, if the value indicated by a specific index has only one value of P1, it is determined as a pattern considering only one transmission period, and if the value indicated by another specific index has the values of P1 and P2, it is regarded as a pattern considering two transmission periods. For example, in Table 4, when the index denotes 3, the UE determines that the transmission period of 0.5 ms is repeated. In contrast, when the index denotes 1, the UE determines that a combination of a first transmission period of 0.5 ms and a second transmission of 0.5 ms is repeated as the combined transmission period.

TABLE 4

| Index | P1 | P2 |
|---|---|---|
| 1 | 0.5 ms | 0.5 ms |
| 2 | 1 ms | 1 ms |
| 3 | 0.5 ms | |
| 4 | . . . | . . . |

The bit field indicating the number of sidelink slots indicates how many sidelink slots are actually contained among slots within the configured transmission period. The number of slots is determined by the configured transmission period and the subcarrier spacing, wherein the transmission period is indicated by the transmission period field, and the subcarrier spacing may follow a sidelink synchronization signal or a value defined in the standard.

When following the value defined in the standard, the subcarrier spacing may have different values or the same value according to FR1 and FR2. When the bit field indicating the number of sidelink slots is N bits, and when the total number of slots in the transmission period to be indicated by the corresponding bit field is K, the granularity indicated by the bit field indicating the number of sidelink slots may be determined using at least one of ceiling($K/2^N$), floor($K/2^N$), round($K/2^N$), or max(floor($K/2^N$),1) or a combination thereof. For example, if the total number of slots within a specific transmission period is 40 and the size of the bit field indicating the period is 4 bits, the number of slots used for sidelink may be indicated at intervals of max(floor(40/16),1)=2. That is, each of 16 values can indicate one of 2, 4, 6, 8, . . . , 32 values from the end of the transmission period as the value of the number of slots used for sidelink. When the bit field indicating the number of sidelink slots indicates two transmission periods, different bit fields may be used, in which case the field sizes may be equal to or different from each other depending on the configured transmission period.

Alternatively, as shown in Table 5 below, it is possible to indicate the number of uplink slots (or the number of slots that can be used for sidelink resources) to the UE, based on the transmission period, the transmission period pattern, and the total number of slots within a specific transmission period. Information of 4 bits for providing transmission period information indicates one index value among indices 1 to 16 in Table 5 and provides related transmission period information P1 and P2. In addition, 1-bit information for providing transmission period pattern information indicates whether to use only one or both of transmission period pattern 1 (P1) and transmission period pattern 2 (P2). When using only one of the transmission period patterns 1 and 2, it is possible to instruct to use only one specific pattern in the standard or to determine one specific value by another higher signal.

In Table 5, 's' is a code that provides subcarrier spacing information, wherein p=1 is 15 kHz, p=2 is 30 kHz, p=3 is 60 kHz, p=4 is 120 kHz, and p=5 is 240 kHz. That is, the subcarrier spacing is represented in general as $15*2^\mu$ kHz depending on the value of 'μ'. With information of 1 bit and 4 bits, the UE may know whether one or a plurality of transmission periods are included in the unit of the transmission period indicating UL slot number information and may know the total number of slots (S1, S2) within a specific transmission period according to the subcarrier spacing. When only S1 or S2 is indicated, 8 bits are used to indicate whether the last 2^8 slots among the total slots within the S1 or S2 transmission period are allocated as uplink slots. When both S1 and S2 are indicated, N1 bits and N2 bits are used to indicate whether the last 2^N1 slots and the last 2^N2 slots among the total slots within the S and S2 transmission periods, respectively, are allocated as uplink slots. The sum of N1 and N2 is 8 bits.

In Table 5 below, the index containing 0.625 ms is valid only at μ=3, the index containing 1.25 ms is valid only at μ=2 or 3, and the index containing 2.5 ms is valid only at μ=1, 2, or 3. In summary, the sidelink TDD configuration information may be determined with 13 bits (i.e., 1+4+8=13), or with 12 bits (i.e., 4+8=12) excluding one bit indicating the transmission period pattern. In this case, it is assumed that two transmission period patterns P1 and P2 are always informed to the UE. If there is one transmission period pattern, and even if the PSBCH informs two transmission period patterns by default, the transmission period and the number of uplink slots therein may be always set to the same value, and thus the Uu can actually operate as if one transmission period is indicated.

TABLE 5

| Index | Tx Period 1 (P1) ms | Tx Period 2 (P2) ms | Total # of slots (S1) for 15 * $2^\mu$ kHz | Total # of slots (S2) for 15 * $2^\mu$ kHz |
|---|---|---|---|---|
| 1 | 0.5 | 0.5 | 0.5 * $2^\mu$ | 0.5 * $2^\mu$ |
| 2 | 0.625 | 0.625 | 0.625 * $2^\mu$ | 0.625 * $2^\mu$ |
| 3 | 1 | 1 | 1 * $2^\mu$ | 1 * $2^\mu$ |
| 4 | 6.5 | 2 | 0.5 * $2^\mu$ | 2 * $2^\mu$ |
| 5 | 2 | 0.5 | 2 * $2^\mu$ | 0.5 * $2^\mu$ |
| 6 | 1.25 | 1.25 | 1.25 * $2^\mu$ | 1.25 * $2^\mu$ |
| 7 | 1 | 3 | 1 * $2^\mu$ | 3 * $2^\mu$ |
| 8 | 3 | 1 | 3 * $2^\mu$ | 1 * $2^\mu$ |
| 9 | 2 | 2 | 2 * $2^\mu$ | 2 * $2^\mu$ |
| 10 | 1 | 4 | 1 * $2^\mu$ | 4 * $2^\mu$ |
| 11 | 4 | 1 | 4 * $2^\mu$ | 1 * $2^\mu$ |
| 12 | 2 | 2 | 2 * $2^\mu$ | 3 * $2^\mu$ |
| 13 | 3 | 2 | 3 * $2^\mu$ | 2 * $2^\mu$ |
| 14 | 2.5 | 2.5 | 2.5 * $2^\mu$ | 2.5 * $2^\mu$ |
| 15 | 5 | 5 | 5 * $2^\mu$ | 5 * $2^\mu$ |
| 16 | 10 | 10 | 10 * $2^\mu$ | 10 * $2^\mu$ |

In 0.5 ms and μ=0, the transmission period has 7 symbol units. Thus, the UE does not regard it as valid information and may treat it as an error. Alternatively, in 0.5 ms and μ=0, the UE may always determine that all resources are configured as uplink resources. The value of μ may be obtained through a sidelink synchronization signal or applied as common or separate values to FR1 and FR2 according to the 3GPP standard, so that the UE may regard it as always being fixed. When the μ value is fixed for each of FR1 and FR2, the UE may have a value different from μ obtained from the sidelink synchronization signal. For example, when μ is defined as 60 kHz in Table 5, the UE may acquire a synchronization signal of 15 kHz. Therefore, if slot information is provided at a subcarrier spacing of 60 kHz when the sidelink slot unit is regarded as a 15 kHz subcarrier spacing, the UE determines slots based on the 15 kHz subcarrier spacing as uplink slots only when all slots based on the 60 kHz subcarrier spacing contained in one slot based on the 15 kHz subcarrier spacing are configured as uplink slots. In other words, when one slot based on the 15 kHz subcarrier spacing contains four slots based on the 60 kHz subcarrier spacing, and when at least one of the four slots based on the 60 kHz subcarrier spacing indicates a slot other than the uplink slot, the UE determines that the slot based on the 15 kHz subcarrier spacing is not the uplink slot. If the bit field indicating the number of sidelink slots (or the number of uplink slots) included in each transmission period is N bits, and when the total number of slots in the transmission period to be indicated by the corresponding bit field is K, the granularity indicated by the bit field indicating the number of sidelink slots is determined using at least one of ceiling ($K/2^N$), floor($K/2^N$), round($K/2^N$), or max(floor($K/2^N$),1) or a combination thereof.

Figure 18:
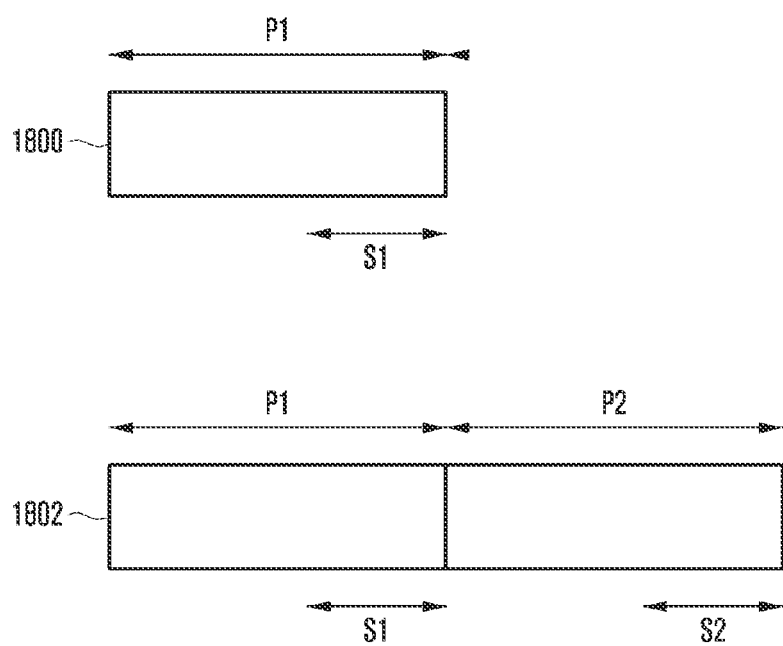
FIG. 18 illustrates a method for setting sidelink resource information according to an embodiment.

FIG. 18 illustrates a method for setting sidelink resource information according to an embodiment.

Among the PSBCH fields, the TDD configuration information is used to provide slot information for transmitting and receiving sidelink data to the UE. Specifically, based on TDD common information operated in Uu by the base station, the UE may notify an UL slot to another UE using sidelink resources. The TDD configuration information is divided into the following detailed elements. The subcarrier spacing indicated in the TDD configuration information may be obtained from a synchronization signal, determined based on a reference subcarrier spacing value by a specific frequency or transmission period, determined through a common upper signal or an L1 signal, or determined through other field information of the PSBCH. For example, when the subcarrier spacing acquired by the UE through a sidelink synchronization signal is 15 kHz, the UE considers that the TDD configuration information is configured based on 15 kHz. In another example, as described in FIG. 17, the subcarrier spacing (or the value of μ) may be obtained through a sidelink synchronization signal or applied as common or separate values to FR1 and FR2 according to the 3GPP standard, so that the UE may regard it as being always fixed.

When the μ value has a fixed value for each of FR1 and FR2, the UE may have a value different from μ obtained from the sidelink synchronization signal. In still another example, the subcarrier spacing and cyclic prefix (CP) used in the sidelink synchronization signal are preconfigured or predefined values for each frequency band, each region, each resource pool, or a combination thereof, and the UE may use it. For example, in using the frequency B in the region A, the UE can perform access with a normal cyclic prefix and a subcarrier spacing of 15 kHz.

Transmission period pattern number indicator: This indicates the number of transmission period patterns. In FIG. 18, it indicates whether the transmission period consists of one pattern 1800 or two patterns 1802. One pattern indicates the number of UL slots (S1) in one transmission period (P1), and two patterns indicate the respective numbers of UL slots (S1, S2) in two separate transmission periods (P1, P2). For example, the transmission period pattern number indicator may be formed of 1 bit.

Transmission period indicator: This indicates one or two transmission periods, based on the transmission period pattern number indicator. For example, as shown in Table 6 below, it is possible to indicate the transmission period(s) depending on the number of transmission period patterns. In another example, the transmission period indicator may be formed of 4 bits to indicate the transmission period(s) as in Table 6.

TABLE 6

| | One Tx Period Pattern | Two Tx Period Patterns | |
|---|---|---|---|
| Index | Tx Period 1 (P1) ms | Tx Period 1 (P1) ms | Tx Period 2 (P2) ms |
| 1 | 0.5 | 0.5 | 0.5 |
| 2 | 0.625 | 0.625 | 6.625 |
| 3 | 1 | 1 | 1 |
| 4 | 1.25 | 0.5 | 2 |

TABLE 6-continued

| | One Tx Period Pattern | | Two Tx Period Patterns |
|---|---|---|---|
| Index | Tx Period 1 (P1) ms | Tx Period 1 (P1) ms | Tx Period 2 (P2) ms |
| 5 | 2 | 2 | 0.5 |
| 6 | 2.5 | 1.25 | 1.25 |
| 7 | 4 | 1 | 2 |
| 8 | 5 | 3 | 1 |
| 9 | 10 | 2 | 2 |
| 10 | | 1 | 4 |
| 11 | | 4 | 1 |
| 12 | | 2 | 3 |
| 13 | | 3 | 2 |
| 14 | | 2.5 | 2.5 |
| 15 | | 5 | 5 |
| 16 | | 10 | 10 |

UL slot number indicator: This indicator may be used interchangeably with a sidelink slot number indicator, and indicates how many last slots within the transmission period are indicated as UL slots. For example, if one transmission period is composed of 10 slots and the UL slot number indicator has the value of 3, the last 3 slots among 10 slots are configured as UL slots. The UL slot number indicator may be formed of n bits. When one transmission period pattern is indicated, the UL slot number indicator indicates the number of UL slots (S1) within the transmission period P1, and when two transmission period patterns are indicated, the UL slot number indicator simultaneously indicates the number of UL slots (S1, S2) within each transmission period (P1, P2). For this, the following Equation (1) or Equation (1A) may be used.

$$SIV = C_1' * B' + A' \quad (1)$$

where $C_1' = \lceil C_1/K \rceil + 1$, $B' = \lceil B/K \rceil$, $A' = \lceil A/K \rceil$, $0 \leq A \leq C_1$, $0 \leq B \leq C_2$ $$SIV = C_1' * B' + A' \quad (1A)$$

where $C_1' = \lceil (C_1+1)/K \rceil$, $B' = \lceil (B+1)/K \rceil - 1$, $A' = \lceil (A+1)/K \rceil - 1$, $0 \leq A \leq C_1$, $0 \leq B \leq C_2$ In Equation (1) or (1A), 'SIV' is an abbreviation of Sidelink resource Indication Value, and is a value expressing the UL slot number indicator in another term. SIV is merely an example, and other abbreviations or terms having similar meanings may be used. 'C1' is the total number of slots contained in the transmission period (P1) of the first pattern, 'C2' is the total number of slots contained in the transmission period (P2) of the second pattern, 'A' is the number of actual UL slots (S1) indicated by the UL slot number indicator in the transmission period (P) of the first pattern, and 'B' is the number of actual UL slots (S2) indicated by the UL slot number indicator in the transmission period (P2) of the second pattern. 'K' is a value determined by 'C1', 'C2', and a bit number (n) of the UL slot number indicator. For example, in $(C_1+1) \cdot (C_2+1) > 2^n$, K is $\lceil \mathrm{sqrt}((C_1+1) \cdot (C_2+1)/2^n) \rceil$, otherwise, K is 1. Alternatively, regardless of the above conditions, $K = \lceil \mathrm{sqrt}((C_1+1) \cdot (C_2+1)/2^n > 1$ may be applied.

In another example, by Equation (1) or (1A), SIV may indicate UL slots in the first transmission period pattern in units of A=0, 1*K, 2*K, . . . , $$\left(\left\lceil \frac{C_1+1}{K} \right\rceil - 1\right) \cdot K,$$

and indicate UL slots in the second transmission period pattern in units of B=0, 1*K, 2*K, . . . , $$\left(\left\lceil \frac{C_2+1}{K} \right\rceil - 1\right) \cdot K.$$

When only one pattern is indicated by the transmission period pattern number indicator, the UE regards, as zero, the values of the second transmission period (P2), the total number (C2) of slots contained in the transmission period (P2) of the second pattern, and the number (B) of actual UL slots (S2) indicated by the UL slot number indicator in the transmission period (P2) of the second pattern P2, so that Equation (1) or (1A) becomes SIV=A'.

In addition, when only one pattern is indicated, it is possible to consider K=1 regardless of the above condition for determining the K value. A ceiling function ($\lceil\ \rceil$) applied in Equation (1) or (1A) may be partially or entirely replaced with a round function ([ ]) or a floor function ($\lfloor\ \rfloor$). Similarly, a ceiling function ($\lceil\ \rceil$) applied in $K = \lceil \mathrm{sqrt}((C_1+1) \cdot (C_1+1)/2^n) \rceil$ may be replaced with a round function ([ ]) or a floor function ($\lfloor\ \rfloor$). For example, in $(C_1+1) \cdot (C_2+1) > 2^7$ when the UL slot number indicator is 7 bits (n=7), $K = \lceil \mathrm{sqrt}((C_1+1) \cdot (C_2+1)/2^7) \rceil$, otherwise, K=1.

In another example, when two transmission period patterns are indicated by Equation (1) or (1A), S1 has values of 0*K, 1*K, 2*K, 3*K, etc., and S2 has values of 0*K, 1*K, 2*K, 3*K, etc. Equation [1] may be available when the respective transmission period patterns apply the same K value, and Equation (2), shown below, may be available when the respective transmission period patterns apply different K values.

$$SIV = C_1' * B' + A' \quad (2)$$

where $C_1' = \lceil C_1/K_1 \rceil + 1$, $B' = \lceil B/K_2 \rceil$, $A' = \lceil A/K_1 \rceil$, $0 \leq A \leq C_1$, $0 \leq B \leq C_2$ Equation (2) has a similar concept to Equation (1) or (1A), but K1 and K2 values are used instead of the K value. K1 is a value determined by C1 and the bit number (n) of the UL slot number indicator, and K2 is a value determined by C2 and the bit number (n) of the UL slot number indicator. For example, in $(C_1+1) > \mathrm{sqrt}(2^n)$, $K_1 = \lceil (C_1+1)/2^n \rceil$, otherwise, K=1. In another example, in $(C_2+1) > \mathrm{sqrt}(2^n)$, $K_2 = \lceil (C_2+1) \mathrm{sqrt}(2^n) \rceil$, otherwise, K=1. In general, in $(C_i+1) > \mathrm{sqrt}(2^n)$, $\lceil (C_i+1)/\mathrm{sqrt}(2^n) \rceil$, otherwise, K=1. Alternatively, regardless of the above conditions, $K_1 = \lceil (C_1+1)/2^n \rceil$ or $K_2 = \lceil (C_2+1)/\mathrm{sqrt}(2^n) \rceil$ may be applied.

When only one pattern is indicated, it is possible to consider $K_i=1$ regardless of the above conditions for determining the $K_1$ value, and $K_2$ does not exist. In another example, the value of 'n' in the above equation may be n=7 when the UL slot number indicator is 7 bits. A ceiling function ($\lceil\ \rceil$) applied in the above equation may be replaced with a round function ([ ]) or a floor function ($\lfloor\ \rfloor$).

In another example, it is possible to inform the UL slot number indicator information through Equation (3), as follows.

$$SIV = (C_1+1) * B + A \quad (3)$$

where $0 \leq A \leq C$, $0 \leq B \leq C_2$

Equation (3) uses a definition similar to Equation (1) or (1A) or Equation (2), but there is no K value. Instead, a reference subcarrier spacing that indicates the UL slot number indicator information is determined according to a specific value determined by the transmission period pattern number indicator and the transmission period indicator. For example, when the UL slot number indicator information is indicated based on a 15 kHz subcarrier spacing by the transmission period pattern number indicator and the transmission period indicator when sidelink resources operate at a 120 kHz subcarrier spacing, the UE may regard one UL slot indicated based on the 15 kHz subcarrier spacing as being applied to a total of 8 slots.

Figure 19:
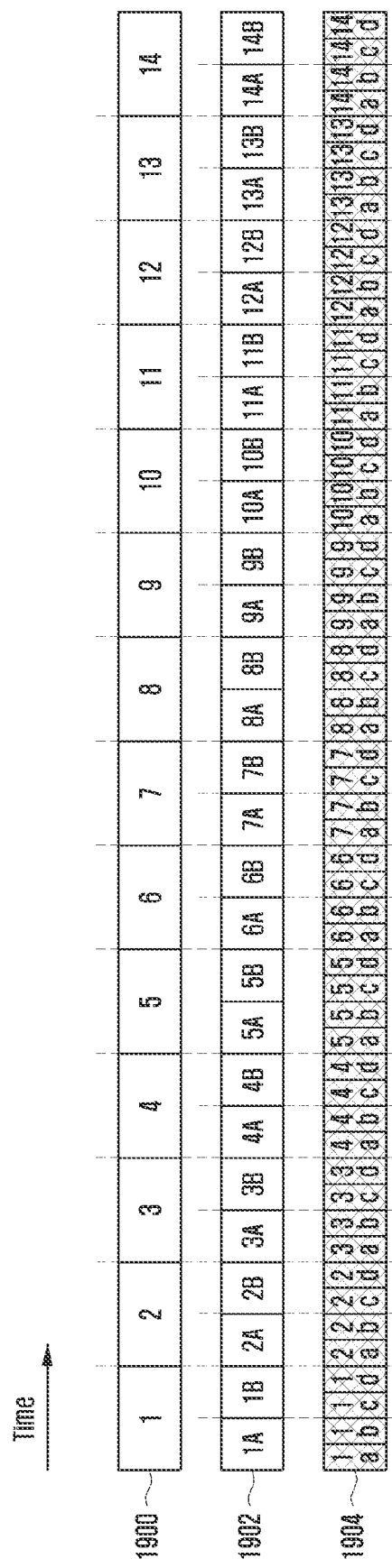
FIG. 19 illustrates a slot structure of a subcarrier spacing according to an embodiment.

FIG. 19 illustrates a slot structure of a subcarrier spacing according to an embodiment.

In FIG. 19, reference numeral 1900 denotes a 15 kHz based slot structure, reference numeral 1902 denotes a 30 kHz based slot structure, and reference numeral 1904 denotes a 60 kHz based slot structure. For example, when the UE receives TDD configuration information based on a normal cyclic prefix and 15 kHz, but sidelink communication actually operates at 60 kHz and the normal cyclic prefix, the UE may receive, through TDD configuration information based on 1900, information that slots 13 and 14 in FIG. 19 are used as UL slots (or sidelink communication slots). In this case, the UE determines that slots 13a, 13b, 13c, 13d, 14a, 14b, 14c, and 14d are configured as UL slots (or sidelink communication slots) in 1904 where sidelink communication is actually performed. In another example, it is possible for the UE to assume that Equation (3) always provides TDD configuration information based on a 15 kHz subcarrier spacing and a normal cyclic prefix. In still another example, in the TDD configuration information, the normal cyclic prefix and the reference subcarrier spacing ($\mu_k$) may be determined by Equation (4) as follows.

$$2^{\mu_k} = \frac{2^{\mu_i}}{\lceil sqrt((C_1+1)\cdot(C_2+1)/2^n)\rceil} \quad (4)$$

Definitions and candidate values of C1, C2, and n in Equation [4] are the same as those described above in Equation (1) or Equations (1A) to (3). '$\mu_i$' denotes a subcarrier spacing at which the UE actually performs sidelink communication. A relationship between the '$\mu$' value and the subcarrier spacing follows Table 7 below. For example, when the UE performs sidelink communication at 120 kHz, the transmission period pattern is set to two (P1, P2), each transmission period is 10 ms (P1=10 ms, P2=10 ms, that is, C1=C2=80), and 'n' is 7 bits, the '$\mu_k$' value is determined to be 0 by the above equation, and the UE determines information on the number of UL slots (or slots for sidelink communication) as shown in FIG. 19 or 20 based on a reference subcarrier spacing of 15 kHz.

In summary, according to Equation (4), the reference subcarrier spacing value ($\mu_k$) applied to the UL slot number indicator is determined based on the total number of slots (C1, C2) for each transmission period indicated by the transmission period pattern number indicator and the transmission period indicator in the TDD configuration information, the number of bits (n) for the UL slot number indicator in the TDD configuration information, and the subcarrier spacing value (pi) at which the UE actually performs sidelink communication. As seen in Table 7 below, the subcarrier spacing value ($\mu_i$) used for actually performing the sidelink communication may be determined by the UE as a preconfigured value according to each frequency band, each region, each resource pool, or a combination thereof. A ceiling function ($\lceil\ \rceil$) applied in Equation (4) may be replaced with a round function ([ ]) or a floor function ($\lfloor\ \rfloor$).

TABLE 7

| subcarrier spacing (kHz) | $\mu$ (e.g., $\mu_i$ or $\mu_k$) |
|---|---|
| 15 | 0 |
| 30 | 1 |
| 60 | 2 |
| 120 | 3 |
| 240 | 4 |

In Table 7, the TDD configuration information may have a total of 12 bits consisting of a 1-bit transmission period pattern number indicator, a 4-bit transmission period indicator, and a 7-bit UL slot number indicator.

It will be understood that each block and combinations of blocks in the flowchart illustrations may be implemented by computer program instructions provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). In some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. A "unit" may be constructed either to be stored in an addressable storage medium or to execute one or more processors. Therefore, a "unit" includes software elements, object-oriented software elements, class elements or task elements, processes, functions, properties, procedures, subroutines, segments of a program code, drivers, firmware, micro-codes, circuits, data, database, data structures, tables, arrays, and variables. The functions provided by elements and units may be combined into those of fewer elements and units or separated into those of more elements and units. In addition, the elements and units may be implemented to operate one or more central processing units (CPUs) within a device or a secure multimedia card. The unit may include one or more processors.

While the disclosure has been particularly shown and described with reference to certain embodiments thereof, it will be understood by those skilled in the art that various changes in form and details may be made therein without departing from the scope of the subject matter as defined by the appended claims.

What is claimed is:

1. A method performed by a first terminal in a wireless communication system, the method comprising:
   transmitting, to a second terminal on a physical sidelink broadcast channel (PSBCH), slot format information for a sidelink communication, the slot format information including first information on a number of one or more patterns, second information on a period of the one or more patterns, and third information on a number of uplink slots of the one or more patterns; and
   performing, with the second terminal, the sidelink communication in at least one sidelink resource identified based on the first information, the second information, and the third information,
   wherein, in case that the first information indicates the number of the one or more patterns as 1, the second information indicates the period of the one or more patterns for a first pattern, and the third information indicates the number of uplink slots for the first pattern, a value of the third information is associated with a number of uplink slots of the first pattern and at least one of a subcarrier spacing parameter, and
   wherein, in case that the first information indicates the number of the one or more patterns as 2, the second information indicates the period of the one or more patterns for the first pattern and a second pattern, and the third information indicates the number of uplink slots for the first pattern and the second pattern, a value of the third information is associated with the number of uplink slots of the first pattern, a number of uplink slots of the second pattern, a number of total slots of the first pattern, and the at least one of the subcarrier spacing parameter.

2. The method of claim 1,
   wherein the at least one of the subcarrier spacing parameter, information associated with the number of uplink slots of the first pattern, information associated with the number of uplink slots of the second pattern, or information associated with the number of total slots of the first pattern is received from a base station.

3. The method of claim 1,
   wherein the slot format information includes 12 bits, and
   wherein the first information includes 1 bit, the second information includes 4 bits, and the third information includes 7 bits.

4. A method performed by a second terminal in a wireless communication system, the method comprising:
   receiving, from a first terminal on a physical sidelink broadcast channel (PSBCH), slot format information for a sidelink communication, the slot format information including first information on a number of one or more patterns, second information on a period of the one or more patterns, and third information on a number of uplink slots of the one or more patterns; and
   performing, with the first terminal, the sidelink communication in at least one sidelink resource identified based on the first information, the second information, and the third information,
   wherein, in case that the first information indicates the number of the one or more patterns as 1, the second information indicates the period of the one or more patterns for a first pattern, and the third information indicates the number of uplink slots for the first pattern, a value of the third information is associated with a number of uplink slots of the first pattern and at least one of a subcarrier spacing parameter, and
   wherein, in case that the first information indicates the number of the one or more patterns as 2, the second information indicates the period of the one or more patterns for the first pattern and a second pattern, and the third information indicates the number of uplink slots for the first pattern and the second pattern, a value of the third information is associated with the number of uplink slots of the first pattern, a number of uplink slots of the second pattern, a number of total slots of the first pattern, and the at least one of the subcarrier spacing parameter.

5. The method of claim 4,
   wherein the at least one of the subcarrier spacing parameter, information associated with the number of uplink slots of the first pattern, information associated with the number of uplink slots of the second pattern, or information associated with the number of total slots of the first pattern is received from a base station.

6. The method of claim 4,
   wherein the slot format information includes 12 bits, and
   wherein the first information includes 1 bit, the second information includes 4 bits, and the third information includes 7 bits.

7. A first terminal in a wireless communication system, the first terminal comprising:
   a transceiver configured to transmit and receive a signal; and
   a controller configured to:
   transmit, to a second terminal on a physical sidelink broadcast channel (PSBCH), slot format information for a sidelink communication, the slot format information including first information on a number of one or more patterns, second information on a period of the one or more patterns, and third information on a number of uplink slots of the one or more patterns, and
   perform, with the second terminal, the sidelink communication in at least one sidelink resource identified based on the first information, the second information, and the third information,
   wherein, in case that the first information indicates the number of the one or more patterns as 1, the second information indicates the period of the one or more patterns for a first pattern, and the third information indicates the number of uplink slots for the first pattern, a value of the third information is associated with a number of uplink slots of the first pattern and at least one of a subcarrier spacing parameter, and
   wherein, in case that the first information indicates the number of the one or more patterns as 2, the second information indicates the period of the one or more patterns for the first pattern and a second pattern, and the third information indicates the number of uplink slots for the first pattern and the second pattern, a value of the third information is associated with the number of uplink slots of the first pattern, a number of uplink slots of the second pattern, a number of total slots of the first pattern, and the at least one of the subcarrier spacing parameter.

8. The first terminal of claim 7,
   wherein the at least one of the subcarrier spacing parameter, information associated with the number of uplink slots of the first pattern, information associated with the number of uplink slots of the second pattern, or information associated with the number of total slots of the first pattern is received from a base station.

9. The first terminal of claim 7,
wherein the slot format information includes 12 bits, and
wherein the first information includes 1 bit, the second information includes 4 bits, and the third information includes 7 bits.

10. A second terminal in a wireless communication system, the second terminal comprising:
a transceiver configured to transmit and receive a signal; and
a controller configured to:
receive, from a first terminal on a physical sidelink broadcast channel (PSBCH), slot format information for a sidelink communication, the slot format information including first information on a number of one or more patterns, second information on a period of the one or more patterns, and third information on a number of uplink slots of the one or more patterns, and
perform, with the first terminal, the sidelink communication in at least one sidelink resource identified based on the first information, the second information, and the third information,
wherein, in case that the first information indicates the number of the one or more patterns as 1, the second information indicates the period of the one or more patterns for a first pattern, and the third information indicates the number of uplink slots for the first pattern, a value of the third information is associated with a number of uplink slots of the first pattern and at least one of a subcarrier spacing parameter, and
wherein, in case that the first information indicates the number of the one or more patterns as 2, the second information indicates the period of the one or more patterns for the first pattern and a second pattern, and the third information indicates the number of uplink slots for the first pattern and the second pattern, a value of the third information is associated with the number of uplink slots of the first pattern, a number of uplink slots of the second pattern, a number of total slots of the first pattern, and the at least one of the subcarrier spacing parameter.

11. The second terminal of claim 10,
wherein the at least one of the subcarrier spacing parameter, information associated with the number of uplink slots of the first pattern, information associated with the number of uplink slots of the second pattern, or information associated with the number of total slots of the first pattern is received from a base station.

12. The second terminal of claim 10,
wherein the slot format information includes 12 bits, and
wherein the first information includes 1 bit, the second information includes 4 bits, and the third information includes 7 bits.

13. The method of claim 1,
wherein the at least one of the subcarrier spacing parameter includes a reference subcarrier spacing.

14. The method of claim 1,
wherein the at least one of the subcarrier spacing parameter, information associated with the number of uplink slots of the first pattern, information associated with the number of uplink slots of the second pattern, or information associated with the number of total slots of the first pattern is received from the second terminal on the PBSCH.

15. The method of claim 4,
wherein the at least one of the subcarrier spacing parameter includes a reference subcarrier spacing.

16. The method of claim 4,
wherein the at least one of the subcarrier spacing parameter, information associated with the number of uplink slots of the first pattern, information associated with the number of uplink slots of the second pattern, or information associated with the number of total slots of the first pattern is received from the second terminal on the PBSCH.

17. The first terminal of claim 7,
wherein the at least one of the subcarrier spacing parameter includes a reference subcarrier spacing.

18. The first terminal of claim 7,
wherein the at least one of the subcarrier spacing parameter, information associated with the number of uplink slots of the first pattern, information associated with the number of uplink slots of the second pattern, or information associated with the number of total slots of the first pattern is received from the second terminal on the PBSCH.

19. The second terminal of claim 10,
wherein the at least one of the subcarrier spacing parameter includes a reference subcarrier spacing.

20. The second terminal of claim 10,
wherein the at least one of the subcarrier spacing parameter, information associated with the number of uplink slots of the first pattern, information associated with the number of uplink slots of the second pattern, or information associated with the number of total slots of the first pattern is received from the second terminal on the PBSCH.

* * * * *